(12) United States Patent
Arata et al.

(10) Patent No.: US 12,322,137 B2
(45) Date of Patent: Jun. 3, 2025

(54) IMAGE PROCESSING DEVICE, IMAGER, INFORMATION PROCESSING DEVICE, DETECTOR, ROADSIDE UNIT, IMAGE PROCESSING METHOD, AND CALIBRATION METHOD

(71) Applicant: KYOCERA Corporation, Kyoto (JP)

(72) Inventors: Koji Arata, Yokohama (JP); Ryuichi Sawada, Yokohama (JP); Shigeto Hattori, Yokohama (JP); Hironobu Tanigawa, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 309 days.

(21) Appl. No.: 17/758,381

(22) PCT Filed: Jan. 5, 2021

(86) PCT No.: PCT/JP2021/000102
§ 371 (c)(1),
(2) Date: Jul. 5, 2022

(87) PCT Pub. No.: WO2021/145236
PCT Pub. Date: Jul. 22, 2021

(65) Prior Publication Data
US 2023/0021721 A1    Jan. 26, 2023

(30) Foreign Application Priority Data

Jan. 14, 2020 (JP) ................................ 2020-003721
Jan. 24, 2020 (JP) ................................ 2020-010286

(51) Int. Cl.
*G06T 7/80* (2017.01)
*G01S 7/40* (2006.01)
(Continued)

(52) U.S. Cl.
CPC .............. *G06T 7/80* (2017.01); *G01S 7/40* (2013.01); *G01S 7/497* (2013.01); *G01S 13/86* (2013.01);
(Continued)

(58) Field of Classification Search
CPC ...... G06V 10/44; G06V 2201/07; G01S 7/40; G01S 7/497; G01S 13/86; G01S 17/87;
(Continued)

(56) References Cited

U.S. PATENT DOCUMENTS

| 8,379,926 B2* | 2/2013 | Kanhere | ................ G06V 20/54 |
| | | | 382/104 |
| 8,823,779 B2 | 9/2014 | Nakamura et al. | |

(Continued)

FOREIGN PATENT DOCUMENTS

| JP | 2010-156609 A | 7/2010 |
| JP | 2010-279023 A | 12/2010 |

(Continued)

OTHER PUBLICATIONS

EPO Written Opinion on Application No. EP 21 741 853 (Year: 2023).*

(Continued)

*Primary Examiner* — Scott A Rogers
(74) *Attorney, Agent, or Firm* — Studebaker Brackett PLLC

(57) ABSTRACT

An image processing device 10 includes an image interface 18, a memory 19, and a controller 20. The image interface 18 acquires a captured image. The positions of specific feature points in a world coordinate system and reference positions of the specific feature points are stored in the memory 19. The controller 20 detects the specific feature points in the captured image. In a case where discrepancy between the position in the captured image and the reference (Continued)

position is found with regard to a predetermined percentage or more of the specific feature points, the controller 20 recalculates a calibration parameter.

10 Claims, 10 Drawing Sheets

(51) Int. Cl.
| | |
|---|---|
| *G01S 7/497* | (2006.01) |
| *G01S 13/86* | (2006.01) |
| *G01S 17/87* | (2020.01) |
| *G06T 7/73* | (2017.01) |
| *G06V 10/44* | (2022.01) |

(52) U.S. Cl.
CPC .............. *G01S 17/87* (2013.01); *G06T 7/74* (2017.01); *G06V 10/44* (2022.01); *G06V 2201/07* (2022.01)

(58) Field of Classification Search
CPC .......... G01B 11/00; G01B 21/00; G08B 1/01; G08B 1/04
See application file for complete search history.

(56) References Cited

U.S. PATENT DOCUMENTS

| | | | | |
|---|---|---|---|---|
| 9,185,402 | B2* | 11/2015 | Wu | H04N 17/002 |
| 9,706,189 | B2* | 7/2017 | Chou | H04N 13/296 |
| 9,772,627 | B2* | 9/2017 | Yamaguchi | G06F 17/16 |
| 9,778,029 | B2* | 10/2017 | Yamaguchi | G01B 11/26 |
| 10,165,262 | B2* | 12/2018 | Arata | G06T 7/13 |
| 10,235,772 | B2* | 3/2019 | Wang | G06T 7/73 |
| 11,935,304 | B2* | 3/2024 | Nakano | G06T 7/248 |
| 12,033,388 | B2* | 7/2024 | Wang | G08G 1/0175 |
| 2008/0166023 | A1* | 7/2008 | Wang | G06T 7/20 |
| | | | | 356/27 |
| 2009/0046897 | A1* | 2/2009 | Rowsell | G06V 20/54 |
| | | | | 382/107 |
| 2010/0283856 | A1* | 11/2010 | Kahler | H04N 17/002 |
| | | | | 348/149 |
| 2014/0126780 | A1* | 5/2014 | Wang | G08G 1/054 |
| | | | | 382/107 |
| 2014/0156219 | A1* | 6/2014 | Soubra | G01C 15/06 |
| | | | | 702/150 |
| 2022/0222857 | A1* | 7/2022 | Yuan | G06T 7/80 |
| 2023/0334699 | A1* | 10/2023 | Schulz | G06T 7/80 |
| 2024/0185615 | A1* | 6/2024 | Arata | G06V 20/58 |

FOREIGN PATENT DOCUMENTS

| | | | | |
|---|---|---|---|---|
| JP | 2012010036 | A * | 1/2012 | ............ G08G 1/054 |
| JP | 2013-009202 | A | 1/2013 | |
| JP | 2014-217052 | A | 11/2014 | |
| JP | 2015-059768 | A | 3/2015 | |
| JP | 2015-202835 | A | 11/2015 | |
| JP | 2017-162184 | A | 9/2017 | |
| JP | 2018-185239 | A | 11/2018 | |
| KR | 20220081699 | A * | 6/2022 | ............ G06T 7/80 |
| WO | WO-2019225681 | A1 * | 11/2019 | ............ G06T 7/246 |
| WO | WO-2020192464 | A1 * | 10/2020 | ............ G06T 7/80 |
| WO | WO-2020192646 | A1 * | 10/2020 | ............ G06K 17/00 |

OTHER PUBLICATIONS

PCT/JP2021/000102 Written Opinion (Form 237) translation (Year: 2021).*
Bhardwaj, Romil, et al. "Autocalib: Automatic traffic camera calibration at scale." ACM Transactions on Sensor Networks (TOSN) 14.3-4 pp. 1-27. (Year: 2018).*
Datondji, Sokemi Rene Emmanuel, et al. "A survey of vision-based traffic monitoring of road intersections." IEEE transactions on intelligent transportation systems 17.10 pp. 2681-2698. (Year: 2016).*

* cited by examiner

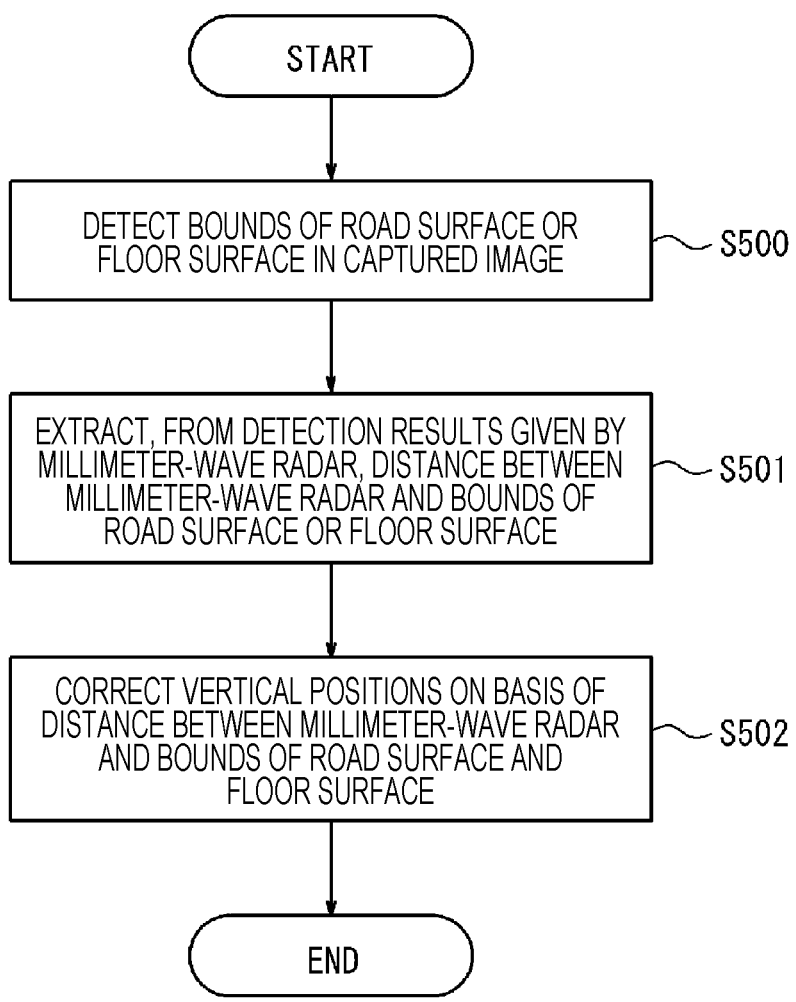

IMAGE PROCESSING DEVICE, IMAGER, INFORMATION PROCESSING DEVICE, DETECTOR, ROADSIDE UNIT, IMAGE PROCESSING METHOD, AND CALIBRATION METHOD

Cross-Reference to Related Application

The present application claims priority to Japanese Patent Application No. 2020-3721 filed on Jan. 14, 2020 and Japanese Patent Application No. 2020-10286 filed on Jan. 24, 2020. The contents of these applications are incorporated herein by reference in their entirety.

TECHNICAL FIELD

The present invention relates to an image processing device, an imager, an information processing device, a detector, a roadside unit, an image processing method, and a calibration method.

BACKGROUND ART

Studies have been conducted on deploying roadside units along roads to support various communications with passing vehicles. For example, roadside units are intended for use in alerting vehicles and pedestrians at intersections with obstructed view. To this end, such a roadside unit includes a camera that captures images of measurement subjects on a road, such as vehicles and pedestrians approaching an intersection. As vehicles and pedestrians on another road come close to the intersection, the roadside unit lets them know the positions of the measurement subjects.

Camera calibration is used to calculate the positions of the measurement subjects on the basis of images captured by the camera. The camera calibration is the process of deriving a calibration parameter for the position and the orientation of the camera in a world coordinate system. An approach to calibrating a camera installed in a roadside unit is presented in PTL 1. The camera captures an image of a measurement vehicle having a mark placed thereon and detects the mark in the image. As the position of the measurement vehicle, the position of the mark in the world coordinate system is determined on the basis of information received by a GPS receiver.

Sensors of different kinds may be used to locate measurement subjects in a wide area, in which case separate calibration for every sensor is required.

An approach to performing axis adjustment for calibration of a millimeter-wave radar sensor and a camera that are mounted on a vehicle is presented in PTL 2. This approach employs a reflector and a target board that are integrated into a target unit.

CITATION LIST

Patent Literature

PTL 1: Japanese Unexamined Patent Application Publication No. 2012-010036

PTL 2: Japanese Unexamined Patent Application Publication No. 2010-156609

SUMMARY OF INVENTION

An image processing device according to a first aspect includes:
- an image interface that acquires a captured image from an imaging module;
- a memory in which positions of specific feature points in a world coordinate system and reference positions are stored, the specific feature points being located on a road surface or a floor surface in a captured image provided by the imaging module, the reference positions being positions of the specific feature points in a captured image provided by the imaging module at any specific timing; and
- a controller capable of detecting the specific feature points in the captured image and capable of calculating, on the basis of the specific feature points and the positions in the world coordinate system, a calibration parameter for calibrating a position and an orientation of the imaging module, wherein
- the controller detects the specific feature points in a captured image provided by the imaging module at a timing different from the specific timing, and
- in a case where discrepancy between the position in the captured image and the reference position is found with regard to a predetermined percentage or more of the specific feature points, the controller recalculates the calibration parameter.

An imager according to a second aspect includes:
- an imaging module that captures an image to provide a captured image;
- a memory in which positions of specific feature points in a world coordinate system and reference positions are stored, the specific feature points being located on a road surface or a floor surface in a captured image provided by the imaging module, the reference positions being positions of the specific feature points in a captured image provided by the imaging module at any specific timing; and
- a controller capable of detecting the specific feature points in the captured image and capable of calculating, on the basis of the specific feature points and the positions in the world coordinate system, a calibration parameter for calibrating a position and an orientation of the imaging module, wherein
- the controller detects the specific feature points in a captured image provided by the imaging module at a timing different from the specific timing, and
- in a case where discrepancy between the position in the captured image and the reference position is found with regard to a predetermined percentage or more of the specific feature points, the controller recalculates the calibration parameter.

A roadside unit according to a third aspect includes:
- an imaging module that captures an image to provide a captured image;
- a memory in which positions of specific feature points in a world coordinate system and reference positions are stored, the specific feature points being located on a road surface or a floor surface in a captured image provided by the imaging module, the reference positions being positions of the specific feature points in a captured image provided by the imaging module at any specific timing; and
- a controller capable of detecting the specific feature points in the captured image and capable of calculating, on the basis of the specific feature points and the positions in the world coordinate system, a calibration parameter for calibrating a position and an orientation of the imaging module, wherein the controller detects the specific feature points in a captured image provided by the imaging module at a timing different from the specific timing, and in a case where discrepancy between the position in the captured image and the reference position is found with regard to a predetermined percentage or more of the specific feature points, the controller recalculates the calibration parameter.

An information processing device according to a fourth aspect includes:

an acquisition module that acquires detection results from sensors including a first sensor, the sensors being capable of detecting motion of waves incident thereon;

a memory in which relative positions and relative orientations of the sensors other than the first sensor are stored, the relative positions and the relative orientations being determined with respect to a position and an orientation of the first sensor; and a controller that calculates a first calibration parameter for calibrating the position and the orientation of the first sensor and a second calibration parameter for calibrating positions and orientations of the sensors other than the first sensor, the first calibration parameter being calculated on the basis of a detection result given by the first sensor capable of detecting motion of waves propagating from an object for calibration, the second calibration parameter being calculated on the basis of the first calibration parameter, the relative positions, and the relative orientations.

A detector according to a fifth aspect includes:

sensors including a first sensor, the sensors being capable of detecting motion of waves incident thereon;

a holder that holds the sensors;

a memory in which relative positions and relative orientations of the sensors other than the first sensor are stored, the relative positions and the relative orientations being determined with respect to a position and an orientation of the first sensor; and a controller that calculates a first calibration parameter for calibrating the position and the orientation of the first sensor and a second calibration parameter for calibrating positions and orientations of the sensors other than the first sensor, the first calibration parameter being calculated on the basis of a detection result given by the first sensor capable of detecting motion of waves propagating from an object for calibration, the second calibration parameter being calculated on the basis of the first calibration parameter, the relative positions, and the relative orientations.

A roadside unit according to a sixth aspect includes:

sensors including a first sensor, the sensors being capable of detecting motion of waves incident thereon;

a holder that holds the sensors;

a memory in which relative positions and relative orientations of the sensors other than the first sensor are stored, the relative positions and the relative orientations being determined with respect to a position and an orientation of the first sensor; and a controller that calculates a first calibration parameter for calibrating the position and the orientation of the first sensor and a second calibration parameter for calibrating positions and orientations of the sensors other than the first sensor, the first calibration parameter being calculated on the basis of a detection result given by the first sensor capable of detecting motion of waves propagating from an object for calibration, the second calibration parameter being calculated on the basis of the first calibration parameter, the relative positions, and the relative orientations.

An image processing method according to a seventh aspect is to be employed by an image processing device.

The image processing method includes:

storing positions of specific feature points in a world coordinate system and reference positions, the specific feature points being located on a road surface or a floor surface in a captured image provided by an imaging module, the reference positions being positions of the specific feature points in a captured image provided by the imaging module at any specific timing;

detecting the specific feature points in a captured image provided by the imaging module at a timing different from the specific timing; and calculating, on the basis of the specific feature points and the positions in the world coordinate system, a calibration parameter for calibrating a position and an orientation of the imaging module in a case where discrepancy between the position in the captured image and the reference position is found with regard to a predetermined percentage or more of the specific feature points.

A calibration method according to an eighth aspect is a calibration method for an information processing device.

The calibration method includes:

calculating and storing relative positions and relative orientations of sensors other than a first sensor, the first sensor and the other sensors being held by a holder to detect motion of waves propagating from objects for calculation of correlation and incident on the sensors, the relative positions and the relative orientations being calculated on the basis detection results given by the sensors and being determined with respect to a position and an orientation of the first sensor;

installing the holder in any specific location, with the sensors being held by the holder;

calculating a first calibration parameter for calibrating the position and the orientation of the first sensor, the first parameter being calculated on the basis of a detection result given by the first sensor capable of detecting motion of waves propagating from an object for calibration; and calculating a second parameter for calibrating positions and orientations of the sensors other than the first sensor, the second parameter being calculated on the basis of the first calibration parameter, the relative positions, and the relative orientations.

BRIEF DESCRIPTION OF DRAWINGS

FIG. 10 is a flowchart for describing how the controller in FIG. 6 executes a road surface estimation procedure.

DESCRIPTION OF EMBODIMENTS

Hereinafter, an embodiment of an image processing device according to the present disclosure will be described with reference to the accompanying drawings.

Figure 1:
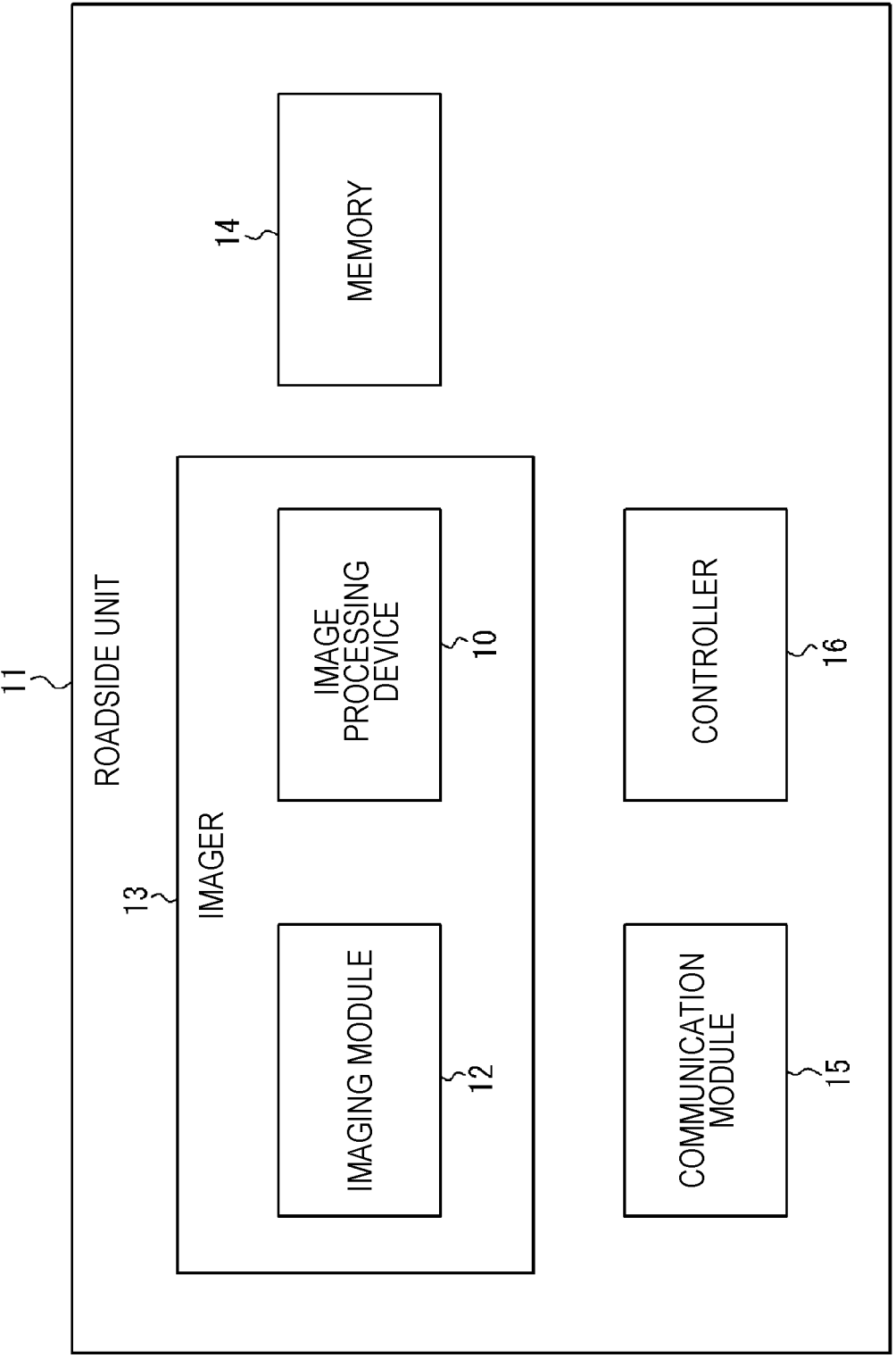
FIG. 1 is a block diagram illustrating the schematic configuration of a roadside unit including an image processing device according to a first embodiment.

Referring to FIG. 1, an image processing device 10 according to a first embodiment of the present disclosure is built in a roadside unit 11. The roadside unit 11 includes an imager 13, a memory 14, a communication module 15, and a controller 16. The imager 13 includes an imaging module 12 and the image processing device 10.

The imaging module 12 captures an image of a scene in a region around the roadside unit 11 to produce imagery. The image processing device 10 determines whether there is a measurement subject in the region around the roadside unit 11, on the basis of the captured image provided by the imaging module 12. Examples of the measurement subject in the first embodiment include human beings, boxy vehicles, motorcycles, and bicycles. If there is a measurement subject, the image processing device 10 calculates the position of the measurement subject in the real space, that is, the position of the measurement subject in a world coordinate system. The location of the roadside unit 11 is stored in the memory 14. The communication module 15 conducts wired or wireless communication with an external device. For example, the external device is a terminal device such as a navigation device used in a vehicle approaching the roadside unit 11 or is a server device configured to determine the current position of a moving vehicle and to transmit traffic information to the vehicle. The external device may be a terminal device for manually calibrating the imaging module 12. In a case where a measurement subject is seen in the captured image, the controller 16 controls the communication module 15 in such a manner that information about the position of the measurement subject in the real space as well as the location of the roadside unit 11 is transmitted to the external device, which in turn notifies the user of the position of the measurement subject.

The imaging module 12 and the image processing device 10 will be described below in detail.

For example, the imaging module 12 is fastened to a structure that is tall enough to capture images of outdoor scenes including road surfaces. Examples of such a structure include traffic lights, utility poles, and streetlights. The position and orientation of the imaging module 12 fastened in place may be determined in advance or may be determined at the time of fastening. The position of the imaging module 12 is defined with respect to its reference position in a world coordinate system, and the orientation of the imaging module 12 is the inclination angle between the imaging module 12 and its reference direction in the world coordinate system. The term "world coordinate system" herein refers to a coordinate system used to describe a three-dimensional space outside the imaging module 12. The imaging module 12 captures an image of a subject located within the angle of view of the imaging module 12 and generates an image signal representing the subject.

Figure 2:
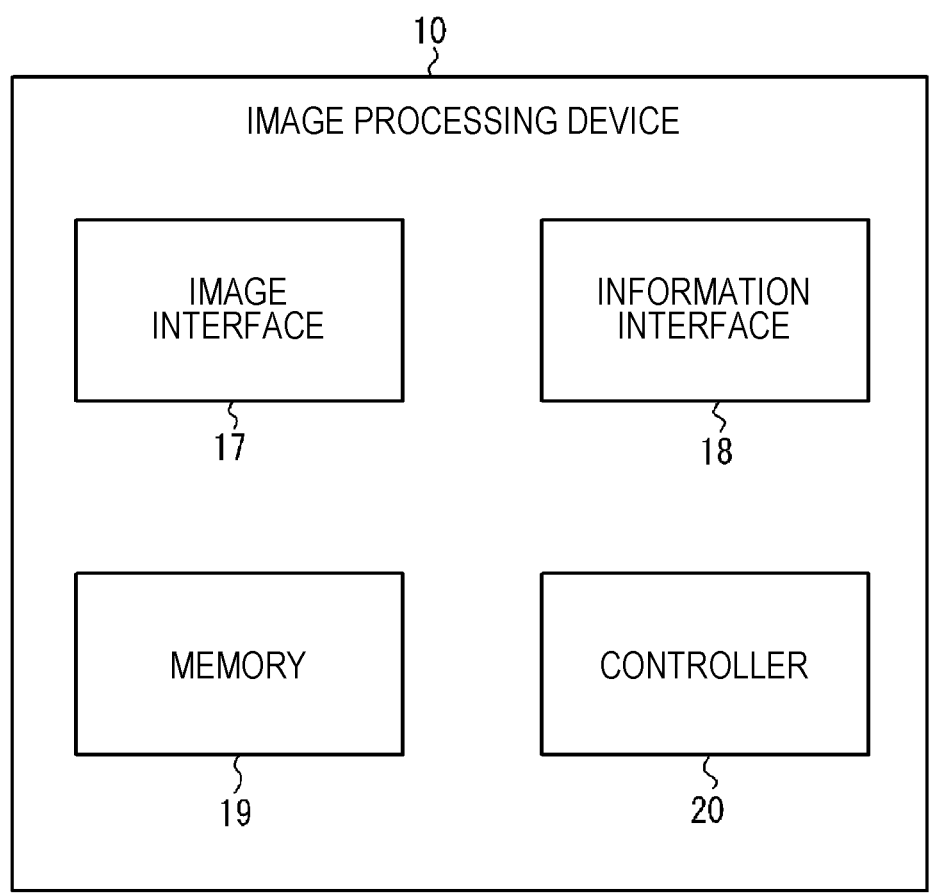
FIG. 2 is a block diagram illustrating the schematic configuration of the image processing device in FIG. 1.

Referring to FIG. 2, the image processing device 10 includes an image interface 17, an information interface 18, a memory 19, and a controller 20.

The image interface 17 acquires a captured image from the imaging module 12. The information interface 18 communicates with the controller 16 included in the roadside unit 11.

The memory 19 includes storage devices, such as random-access memory (RAM) and read-only memory (ROM). Various kinds of programs for causing the controller 20 to perform its functions and various kinds of information for use by the controller 20 are stored in the memory 19.

The positions of specific feature points in the world coordinate system are also stored in the memory 19. The specific feature points are seen in a captured image provided by the imaging module 12 fastened to a structure. The controller 20 is capable of detecting the specific feature points. Each of the specific feature points in the captured image corresponds to, for example, a point whose location in the real space remains unchanged. For example, the specific feature points each may be a corner of a road marking on a road surface or a lower end of a structure on a floor surface. Examples of the corner of a road marking include the four corners of a cross walk and corners of a white lane line. Examples of the lower end of a structure include corners of a vending machine. The positions of the specific feature points in the world coordinate system are stored in the memory 19 by using a terminal device for manual calibration, which will be described later. The reference positions are also stored in the memory 19. The reference positions are positions of the specific feature points in a captured image provided at any specific timing by the imaging module 12.

A conversion equation or a conversion table for conversion of coordinates from a two-dimensional image coordinate system to the world coordinate system may be stored in the memory 19. The image coordinate system may be defined by two axes representing the longitudinal and lateral directions of the captured image provided by the imaging module 12. The world coordinate system may be defined by an axis representing the vertical direction in the real space and by two axes representing the respective directions parallel to a horizontal plane and orthogonal to each other. The conversion equation or the conversion table may be calibrated by using a calibration parameter for calibrating the position and the orientation of the imaging module 12. The conversion equation or the conversion table is used in conversion of coordinates of an object on a road surface or a floor surface in a captured image or, more specifically, conversion of the coordinates from the image coordinate system to the world coordinate system.

The controller 20 includes more than one processor and memory. Examples of the processors include a general-purpose processor and a purpose-built processor. The general-purpose processor fetches specific programs to perform specific functions. The purpose-built processor is tailored to a specific processing. The purpose-built processor may include an application-specific integrated circuit (ASIC). Examples of the processors also include a programmable logic device (PLD). The PLD may include a field-programmable gate array (FPGA). The controller 20 includes one processor or several processors that are integrated into a system-on-a-chip (SoC) configuration or a system in a package (SiP) to work in cooperation.

The controller 20 conducts manual calibration in the following manner upon receipt of a request to do so from the terminal device for manual calibration by way of the information interface 18 and the communication module 15.

In the execution of manual calibration, the controller 20 acquires the positions of the specific feature points in the world coordinate system and the positions of the specific feature points in the captured image and calculates a calibration parameter. Feature points necessary for the execution of calibration are to be identified. For example, five or more feature points are preferably identified, ten or more feature points are more preferably identified, and twenty or more feature points are particularly preferably identified.

The controller 20 acquires the positions of the feature points in the world coordinate system from, for example, GPS receivers or the terminal device for manual calibration by way of the information interface 18. After acquiring information about the positions of the feature points in the world coordinate system, the controller 20 stores the information in the memory 19.

The positional information may be acquired from the GPS receivers in the following manner. Each GPS receiver is installed in a place where the GPS receiver lends itself to being identified in the captured image by the controller 20. For example, the GPS receiver is placed on a corner of a road marking on a road surface within the angle of view of the imaging module 12 or is placed on a corner of the lower end of a vending machine on a floor surface within the angle of view of the imaging module 12. Each GPS receiver calculates its position in a horizontal plane on the basis of signals received from several satellites. When receiving the information about the location of each GPS receiver directly from the GPS receiver or by way of the terminal device for manual calibration, the controller 20 uses the received information in combination with the coordinate in the height direction for specifying the vertical position of the road surface or the floor surface. In this way, the controller 20 acquires the positions of the specific feature points in the world coordinate system. Multiple GPS receivers are to be installed in different places by the user, in which case the controller 20 acquires the positions of multiple specific feature points in the world coordinate system.

Alternatively, the positional information may be acquired from the terminal device for manual calibration in the following manner. The user operates the terminal device in such a way as to cause the terminal device to display a map or a survey drawing on its display, where an aerial photograph of a region around the structure to which the imaging module 12 is fastened is superimposed on the map or the survey drawing. Then, the user operates the terminal device to specify, on the map or the survey drawing, several points on a road or a floor surface that lend themselves to being identified in the captured image by the controller 20. Examples of the points to be identified include corners of a road marking on a road surface within the angle of view of the imaging module 12 and corners of the lower end of a vending machine on a floor surface within the angle of view of the imaging module 12. When receiving the information about the positions of the specified points in the aerial photograph from the terminal device for manual calibration, the controller 20 uses the received information in combination with the coordinate in the height direction for specifying the vertical position of the road surface or the floor surface. In this way, the controller 20 acquires the positions of the specific feature points in the world coordinate system.

To acquire the positions of the specific feature points in the captured image, the controller 20 controls the information interface 18 in such a manner that the captured image provided by the imaging module 12 is transmitted to the terminal device for manual calibration. In exchange for transmitting the captured image, the controller 20 acquires, by way of the information interface 18, the positions in the captured image that correspond to the positions of the specific feature points in the world coordinate system. The terminal device for calibration displays the captured image and a map on which the positions of the feature points in a horizontal plane are shown on the basis of the positions of the feature points in the world coordinate system. The user is to perform input for specifying the positions of the feature points in the captured image while looking at the positions of the feature points shown on the map. After acquiring information about the positions of the feature points in the captured image, the controller 20 stores the information in the memory 19.

The controller 20 calculates a calibration parameter in the following manner. First, the controller 20 derives a hypothetical parameter by calculation. For example, the controller 20 applies a five-point algorithm to the position of each of the specific feature points in the captured image and the position of each of the specific feature points in the world coordinate system such that a hypothetical parameter is derived as a parameter for calibrating the conversion equation or the conversion table.

The controller 20 convers the position of each feature point in the world coordinate system to the position in the captured image with the conversion equation or the conversion table calibrated by using the hypothetical parameter. The controller 20 calculates the distance between the converted position of each feature point in the captured image and the position of the corresponding feature point in the captured image based on the information acquired from the terminal device for manual calibration.

If the distance determined by calculation is less than a threshold value, the controller 20 designates, on a temporary basis, the feature point corresponding to the distance as a reference feature point for use in automatic calibration.

If the distance determined by calculation is greater than or equal to the threshold value, the controller 20 plots two point images on the captured image. One of the point images represents the position converted from the position in the world coordinate system. The other point image represents the position based on the information acquired from the terminal device for manual calibration. For example, the point images are plotted in different colors in a manner so as to be distinguishable from each other. The controller 20 controls the information interface 18 in such a manner that the captured image on which the point images are plotted is transmitted to the terminal device for manual calibration.

In exchange for transmitting the captured image on which the point images are plotted, the controller 20 acquires the position of the feature point corresponding to the point images. More specifically, the controller 20 acquires the respecified position of the feature point in the captured image or the respecified position of the feature point in the world coordinate system. The user of the terminal device for manual calibration is to perform input for respecifying, on the basis of the captured image on which the point images are plotted, the position of the feature point in the captured image or the position of the feature point in the world coordinate system in such a way as to reduce the distance between the two point images.

The controller 20 derives, by calculation, another hypothetical calibration parameter for the feature point for which the distance is found to be greater than or equal to the threshold value. To this end, the controller 20 applies a five-point algorithm to the combination of the respecified position of the feature point in the captured image and the position of the feature point in the world coordinate system based on the information stored in the memory 19 or to the combination of the position in the captured image based on the information stored in the memory 19 and the respecified position of the feature point in the world coordinate system as well as to the position of the reference feature point in the captured image and the position of the reference feature point in the world coordinate system.

Once again, the controller 20 convers the position of the feature point in the world coordinate system to the position in the captured image with the conversion equation or the conversion table calibrated by using the hypothetical parameter. The controller 20 calculates the distance between the converted position of the feature point in the captured image and the position of the corresponding feature point in the captured image based on the information acquired from the terminal device for manual calibration.

The controller 20 repeats the calculation for deriving a hypothetical parameter, the conversion from the position of each feature point in the world coordinate system to the position in the captured image, and the calculation for determining the distance until the number of reference feature points reaches or exceeds a threshold value. Reference feature points necessary for the execution of calibration are to be designated. For example, five or more reference feature points are preferably designated, ten or more reference feature points are more preferably designated, and twenty or more reference feature points are particularly preferably designated.

The controller 20 determines the definitive initial value of the calibration parameter. More specifically, the hypothetical parameter used when the number of reference feature points reaches or exceeds the threshold value is conclusively determined to be the initial value of the calibration parameter. The controller 20 fetches the conversion equation or the conversion table from the memory 19 and calibrates it by using the definitive calibration parameter. The controller 20 then store the calibrated conversion equation or the calibrated conversion table in the memory 19 again.

The controller 20 convers the positions of the reference feature points in the world coordinate system to the positions in the captured image by using the calibrated conversion equation or the calibrated conversion table. The converted positions in the captured image are stored in the memory 19 as the reference positions of the feature points by the controller 20. The controller 20 extracts feature values of the reference feature points from the captured image. The controller 20 then stores the extracted feature values in the memory 19.

The controller 20 can conduct automatic calibration after ending manual calibration. In other words, the controller 20 can conduct automatic calibration when newly acquiring, from the imaging module 12, a captured image provided at a timing different from the specific timing of provision of the captured image for use in calculation of the reference positions. Automatic calibration may be conducted every time a frame of captured image is acquired. Automatic calibration may be conducted in a predetermined frame period or at regular intervals. In the first embodiment, automatic calibration is conducted in a predetermined frame period.

In automatic calibration, the controller 20 detects reference feature points in the new captured image on the basis of the feature values stored in the memory 19. After manual calibration is conducted, the locations in the real space that correspond to the reference feature points may be hidden from view by an object such as a vehicle. In such a case, the controller 20 can fail to detect the reference feature points in the captured image. If the number of reference feature points detected by the controller 20 is out of a practical reference range, the controller 20 will not calculate the calibration parameter for the captured image from that point onward. The lower limit of the practical reference range may be the minimum number of feature points required to calculate the calibration parameter. For example, the lower limit of the practical reference range may be five. Alternatively, the lower limit of the practical reference range may be a predetermined percentage with respect to the total number of reference feature points stored in the memory 19. For example, the lower limit of the practical reference range may be 60%.

If the number of reference feature points detected by the controller 20 falls within the practical reference range, the controller 20 determines the positions of the reference feature points in the new captured image. The controller 20 determines whether the discrepancy between the position of each of the detected reference feature points in the captured image and the reference position stored in the memory 19 is greater than or equal to the threshold value.

If the positional discrepancy greater than or equal to the threshold value is found with regard to a predetermined percentage or more of the detected reference feature points, the controller 20 recalculates the calibration parameter by using the determined positions of the reference feature points in the captured image and the positions of the reference feature points in the world coordinate system based on the information stored in the memory 19. The predetermined percentage is to be adequate to determine that the position or orientation of the imaging module 12 has changed. For example, the predetermined percentage is 50%. The predetermined percentage is preferably 30% and is more preferably 20%. In a case where not all the reference feature points stored in the memory 19 are detectable in the new captured image, the controller 20 calculates the calibration parameter by using detected feature points corresponding to some of the reference feature points stored in the memory 19. If the positional discrepancy greater than or equal to the threshold value is not found with regard to the predetermined percentage or more of the detected reference feature points, the controller 20 will not calculate the calibration parameter from that point onward.

The conversion equation or the conversion table stored in the memory 19 is calibrated by the controller 20 using the recalculated calibration parameter. The controller 20 then stores the calibrated conversion equation or the calibrated conversion table in the memory 19. The controller 20 convers the positions of the reference feature points in the world coordinate system based on the information stored in the memory 19 to the positions in the captured image by using the calibrated conversion equation or the calibrated conversion table. The converted positions in the captured image are stored in the memory 19 as new reference positions by the controller 20. The controller 20 then conducts automatic calibration by using the new reference positions.

After conducting manual calibration or automatic calibration, the controller 20 determines whether there is a measurement subject in the region around the roadside unit 11. If there is a measurement subject, the controller 20 calculates the position of the measurement subject.

When acquiring a frame of captured image from the imaging module 12, the controller 20 determines whether there is a measurement subject seen in the captured image. The controller 20 determines whether there is a measurement subject, on the basis of the detectability of the measurement subject in the captured image. For example, the controller 20 employs a well-known detection method, such as pattern matching or deep learning.

When detecting a measurement subject on a road surface or a floor surface, the controller 20 determines the position of the measurement subject on the road surface or the position of the lower end of the measurement subject on the floor surface. The controller 20 then converts the determined position to the position in the world coordinate system by using the conversion equation or the conversion table stored in the memory 19. The controller 20 controls the information interface 18 in such a manner that information about the measurement subject and its position in the world coordinate system is transmitted to the external device.

Figure 3:
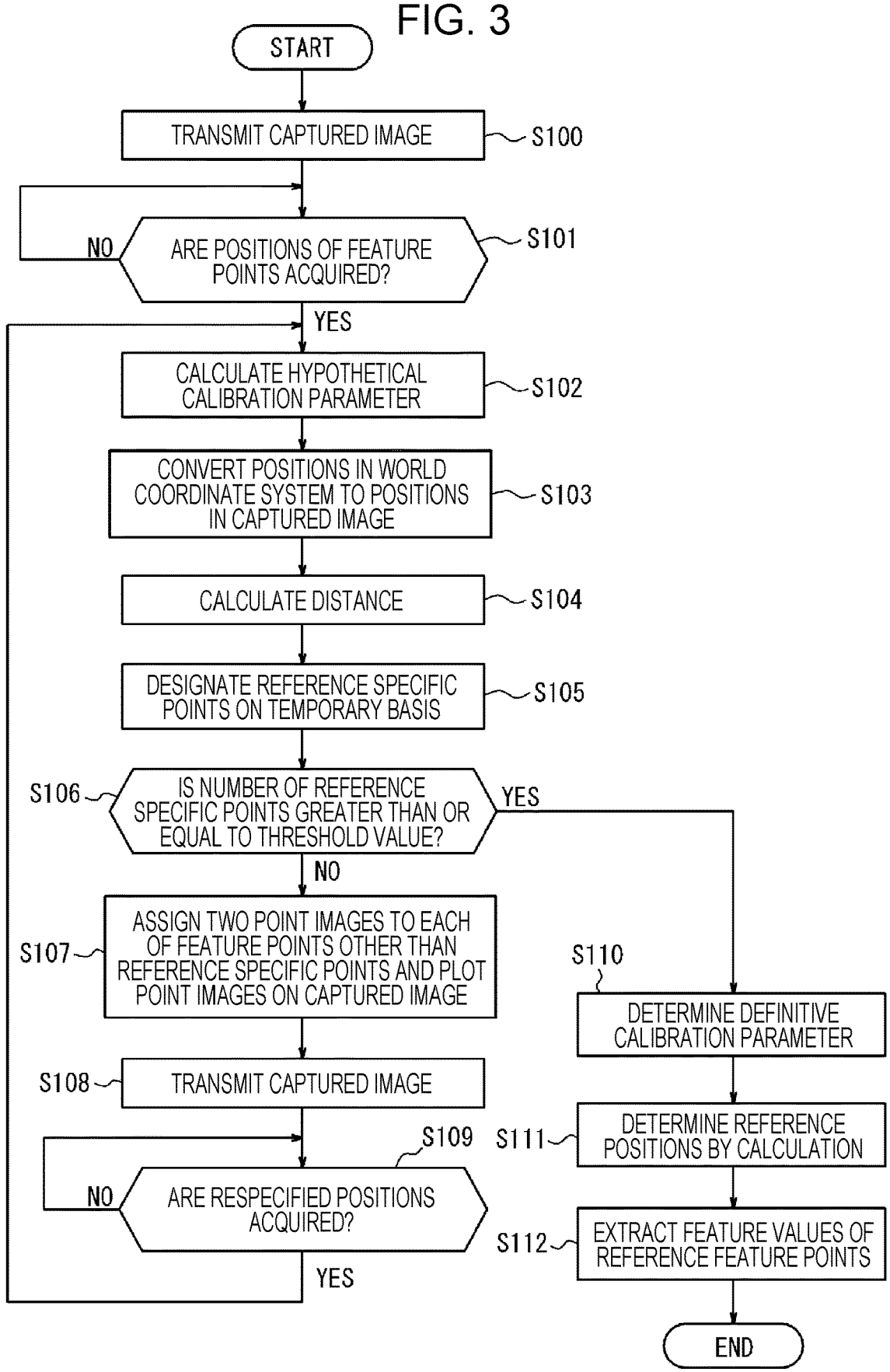
FIG. 3 is a flowchart for describing how a controller in FIG. 2 executes a manual calibration procedure.

A procedure by which the controller 20 in the first embodiment conducts manual calibration will be described below with reference to the flowchart in FIG. 3. The controller 20 starts executing the manual calibration procedure upon receipt of a request to do so from the terminal device for manual calibration.

In Step S100, the controller 20 controls the information interface 18 in such a manner that the captured image acquired from the imaging module 12 is transmitted to the terminal device for manual calibration. Progression to Step S101 occurs subsequent to the transmission.

In Step S101, the controller 20 determines whether the positions of the specific feature points in the world coordinate system and the positions of the specific feature points in the captured image are acquired from the terminal device for manual calibration in exchange for transmitting the captured image to the terminal device in Step S100. If acquisition the positions is not determined, a return to Step S101 is made. If acquisition of the positions is determined, progression to Step S102 occurs.

In Step S102, the controller 20 derives a hypothetical calibration parameter by calculation on the basis of the positions whose acquisition is determined in Step S101 (the positions of the specific feature points in the world coordinate system and the positions of the specific feature points in the captured image) and the positions whose acquisition is determined in Step S109 (the respecified positions of the feature points). Progression to Step S103 occurs subsequent to the calculation.

In Step S103, the controller 20 converts the positions of the specific feature points in the world coordinate system (the positions whose acquisition is determined in Step S101) to the positions in the captured image by using the hypothetical calibration parameter derived by calculation in Step S103. Progression to Step S104 occurs subsequent to the return.

In Step S104, the controller 20 conducts calculation for all of the feature points to determine the distance between the position whose acquisition is determined in Step S101 (the position of each feature point in the captured image) and the position converted in Step S103 (the position of the corresponding feature point in the captured image). Progression to Step S105 occurs subsequent to the calculation.

In Step S105, the controller 20 designates reference specific points. More specifically, each of the feature points for which the distance calculated in Step S104 is not greater than or equal to a threshold value is designated as a reference specific point on a temporary basis. Progression to Step S106 occurs subsequent to the designation.

In Step S106, the controller 20 determines whether the number of reference specific points designated in Step S105 on a temporary basis is greater than or equal to a threshold value. If the number of reference specific points is not greater than or equal to the threshold value, progression to Step S107 occurs. If the number of reference specific points is greater than or equal to the threshold value, progression to Step S110 occurs.

In Step S107, the controller 20 assigns two distinguishable point images to each feature point for which the distance calculated in Step S104 is greater than or equal to the threshold value, that is, to the feature points except for the reference feature points designated in Step S105 on a temporary basis and then plots the point images on the captured image. The two point images each represent a position in the captured image, where one of the point images represents the position whose acquisition is determined in the Step S101, and the other point image represents the position converted in Step S103. Progression to Step S108 occurs after the point images are plotted.

In Step S108, the controller 20 controls the information interface 18 in such a manner that the captured image on which the point images are plotted in Step S107 is transmitted to the terminal device for manual calibration. Progression to Step S109 occurs subsequent to the transmission.

In Step S109, the controller 20 determines whether the respecified positions of the specific feature points in the world coordinate system and the positions of the specific feature points in the captured image are acquired from the terminal device for manual calibration in exchange for transmitting the captured image to the terminal device in Step S109. If acquisition of the positions is not determined, a return to Step S109 is made. If acquisition of the positions is determined, a return to Step S102 is made.

In Step S110, the controller 20 determines the definitive initial value of the calibration parameter. More specifically, the hypothetical parameter calculated in Step S102 is conclusively determined to be the initial value of the calibration parameter. The controller 20 fetches the conversion equation or the conversion table from the memory 19 and calibrates it by using the definitive calibration parameter. The controller 20 stores the calibrated conversion equation or the calibrated conversion table in the memory 19 again. The controller 20 determines the definitive reference specific points. More specifically, the reference specific points designated in Step S105 on a temporary basis are conclusively determined to be the reference specific points that will be used from that point onward. Progression to Step S111 occurs after the definitive reference specific points are determined.

In Step S111, the controller 20 calculates the reference positions by converting the positions of the specific feature points in the world coordinate system (the positions whose acquisition is determined in Step S101) to the positions in the captured image by using the conversion equation or the conversion table calibrated in Step S110. The reference positions determined by calculation are then stored in the memory 19 by the controller 20. Progression to Step S112 occurs subsequent to the calculation.

In Step S112, the controller 20 extracts, from the captured image, feature values of the definitive reference specific points determined in Step S110. The controller 20 then stores, in the memory 19, the extracted feature values in connection with the corresponding reference feature points. With the feature values stored, the manual calibration procedure ends.

Figure 4:
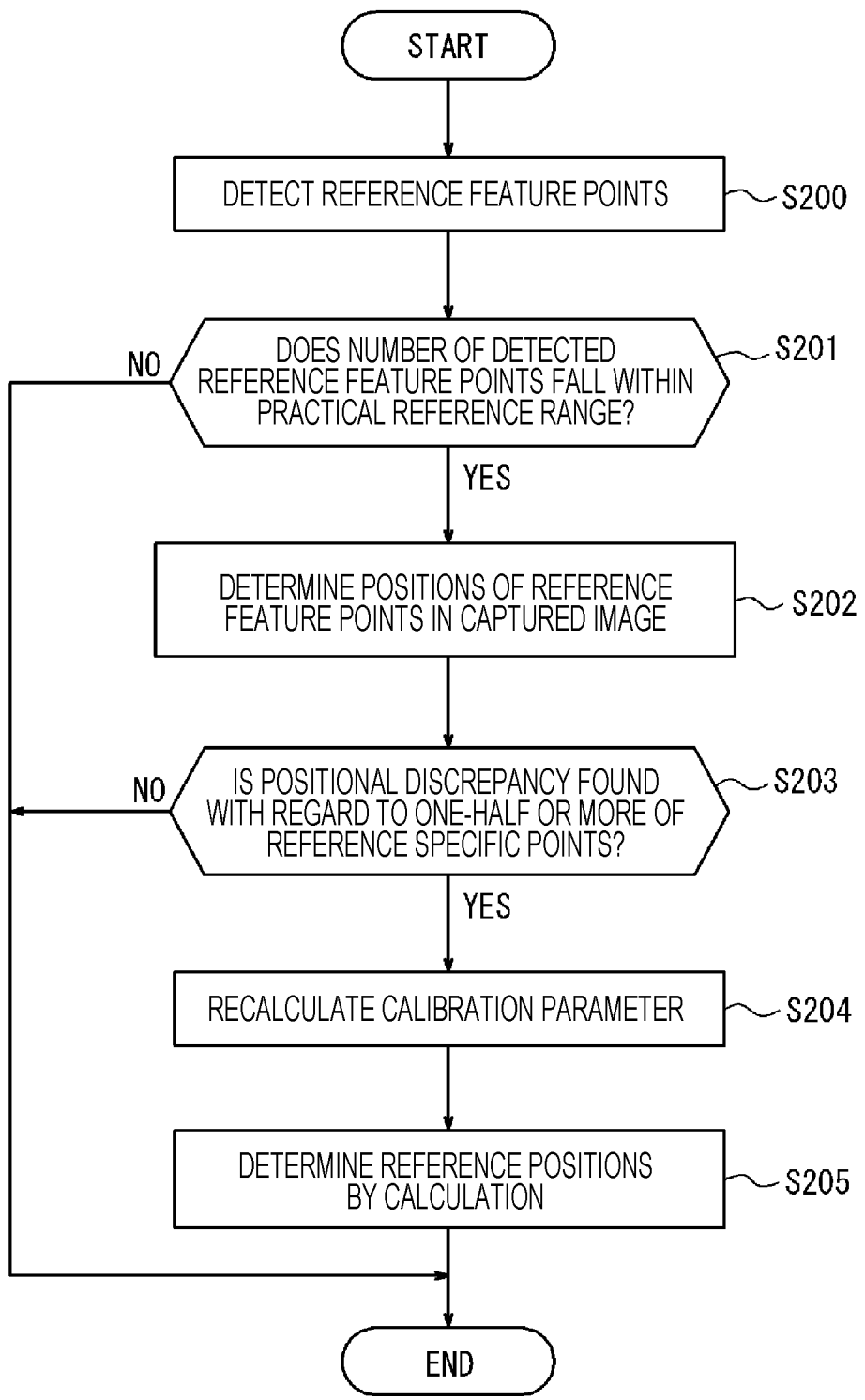
FIG. 4 is a flowchart for describing how the controller in FIG. 2 executes an automatic calibration procedure.

A procedure by which the controller 20 in the first embodiment conducts automatic calibration will be described below with reference to the flowchart in FIG. 4. The automatic calibration procedure starts in a predetermined frame period after the manual calibration procedure ends.

In Step S200, the controller 20 detects the reference feature points in the new captured image on the basis of the feature values that are stored in the memory 19 in connection with the corresponding reference feature points. Progression to Step S201 occurs subsequent to the detection.

In Step S201, the controller 20 determines whether the number of reference feature points detected in Step S200 falls within the practical reference range. If the number of detected reference feature points is out of the practical reference range, the automatic calibration procedure ends. If the number of detected reference feature points falls within the practical reference range, progression to Step S202 occurs.

In Step S202, the controller 20 determines the positions of the reference feature points in the captured image. Progression to Step S203 occurs after the positions are determined.

In Step S203, the controller 20 determines whether the number of reference feature points where the discrepancy between the position in the captured image determined in Step S202 and the reference position stored in the memory 19 is greater than or equal to the threshold value is greater than or equal to one-half of the total number of reference feature points detected in Step S200. If the number of reference feature points concerned is not greater than or equal to one-half of the total number of feature points detected in Step S200, the automatic calibration procedure ends. If the number of reference feature points concerned is greater than or equal to one-half of the total number of reference feature points detected in Step S200, progression to Step S204 occurs.

In Step S204, the controller 20 recalculates the calibration parameter by using the positions of the reference feature points in the captured image (the positions determined in Step S202) and the positions of the reference feature points in the world coordinate system based on the information stored in the memory 19. The controller 20 fetches the conversion equation or the conversion table from the memory 19 and calibrates it by using the recalculated calibration parameter. The controller 20 then stores the calibrated conversion equation or the calibrated conversion table in the memory 19 again. Progression to Step S205 occurs subsequent to the recalculation.

In Step S205, the controller 20 calculates the reference positions by converting the positions in the world coordinate system based on the information stored in the memory 19 to the positions in the captured image by using the conversion equation or the conversion table calibrated in Step S204. The reference positions determined by calculation are then stored in the memory 19 by the controller 20. With the reference positions determined, the automatic calibration procedure ends.

As described above, the image processing device 10 according to the first embodiment includes the memory 19 in which the positions of the specific feature points in a captured image provided by the imaging module 12 at any specific timing are stored as reference positions. The reference feature points are then detected in a captured image provided by the imaging module 12. In a case where the discrepancy between the position in the captured image and the reference position is found with regard to one-half or more of the total number of detected reference feature points, the calibration parameter is recalculated. Points whose positions in the world coordinate system remain unchanged are designated as the reference feature points. Examples of such a point include corners of a white lane line on a road surface. With the reference feature points stored, the image processing device 10 can calculate the calibration parameter without the need to place calibration markers in the angle of view of the imaging module 12. The image processing device 10 estimates the deviation in the position or orientation of the imaging module 12 by determining the deviation from the reference position. When there is a great deviation from the reference position, the image processing device 10 calculates the calibration parameter. Thus, calibration can be conducted on an as-needed basis. Thus, the image processing device 10 can abbreviate the procedure for calibrating the imaging module 12.

The image processing device 10 according to the first embodiment obtains the initial value of the calibration parameter by calculation on the basis of the positions acquired from the information interface 18, that is, on the basis of the positions of the specific feature points in the captured image and the positions of the specific feature points in the world coordinate system. The image processing device 10 is capable of acquiring, from the terminal device for manual calibration, the positions specified by the user of the terminal device or, more specifically, the positions of the specific feature points in the capture image and the positions of the specific feature points in the world coordinate system. The positions of the feature points are determined in this manner such that the possibility of erroneous identification by the computer is reduced, and the image processing device 10 is capable of calculating the calibration parameter on the basis of the positions of the feature points. The image processing device 10 is thus capable of conducting calibration with high accuracy.

The image processing device 10 according to the first embodiment may be configured in such a manner that the positions in the world coordinate system include positions determined on the basis of signals received by GPS receivers placed in locations corresponding to the feature points. In this case, the image processing device 10 does not necessitate the user's input for specifying the positions in the world coordinate system. Thus, the image processing device 10 can conduct initial calibration with great facility.

Alternatively, the image processing device 10 according to the first embodiment may be configured in such a manner that the positions in the world coordinate system include positions specified on a map or on a survey drawing. In this case, the image processing device 10 does not necessitate deployment of GPS receivers in the real space. Thus, the preparation necessary for the image processing device 10 to conduct initial calibration may be simpler than in the case of deploying GPS receivers.

The image processing device 10 according to the first embodiment may be configured in such a manner that the positions of the reference feature points in the world coordinate system may be converted to positions in the captured image by using the calibration parameter and may be stored in the memory 19 as reference positions. Thus, the image processing device 10 can recalculate the calibration parameter by comparing the positions of the feature points in a new captured image with the positions that are better suited than the specified positions of the feature points in the captured image provided at any specific timing.

In a case where not all the reference feature points are detectable in the captured image, the image processing device 10 according to the first embodiment may calculate the calibration parameter by using the reference feature points except for those undetectable in the captured image. Thus, the image processing device 10 can calculate the calibration parameter in a situation where not all the reference feature points are detectable due to, for example, heavy traffic of vehicles.

The image processing device 10 according to the first embodiment may be configured to stop calculating the calibration parameter in a case where the number of reference feature points detectable in the captured image is out of a practical reference range. A lower limit is set to the number of feature points required to calculate the calibration parameter, where the positions of the feature points in the capture image and the positions of the feature points in the world coordinate system are known. With a higher minimum number of reference feature points required to calculate a calibration parameter, calibration can be conducted with a higher degree accuracy. The image processing device 10 is kept from making an attempt to calculate the calibration parameter in a situation where calculation is unfeasible or where the degree of calibration accuracy is low. Thus, the image processing device 10 can calculate the calibration parameter that enables highly accurate calibration.

Hereinafter, an embodiment of an information processing device according to the present disclosure will be described with reference to the accompanying drawings.

Figure 5:
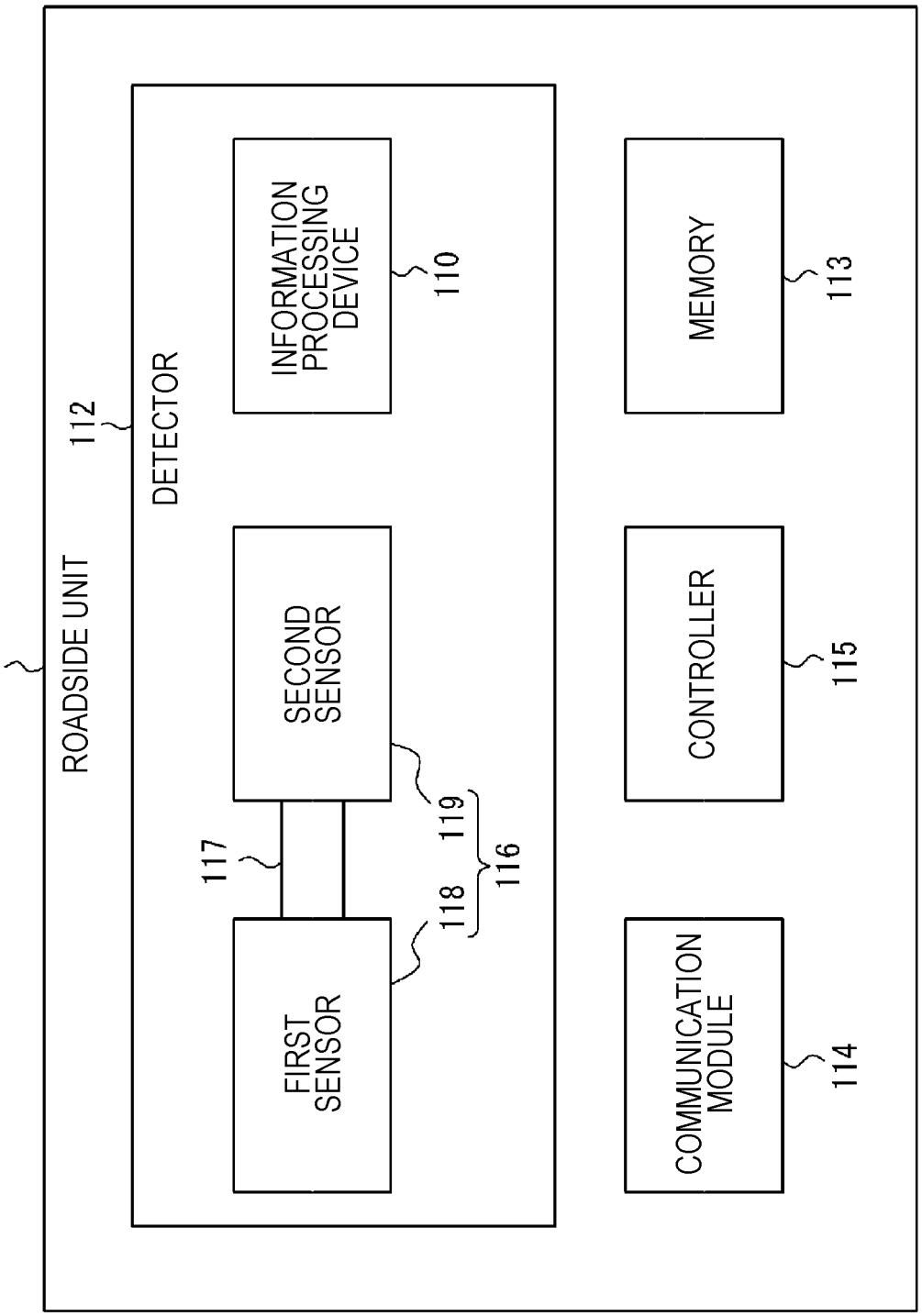
FIG. 5 is a block diagram illustrating the schematic configuration of a roadside unit including an information processing device according to a second embodiment.

Referring to FIG. 5, an information processing device 110 according to a second embodiment of the present disclosure is built in a roadside unit 111. The roadside unit 111 includes a detector 112, a memory 113, a communication module 114, and a controller 115.

The detector 112 detects motion of waves propagating from around the roadside unit 111. The detector 112 locates a measurement subject in the region around the roadside unit 111 in the real space on the basis of the detected wave. More specifically, the detector 112 determines the position of the measurement subject in the world coordinate system. Examples of the measurement subject in the second embodiment include human beings, boxy vehicles, motorcycles, and bicycles. The location of the roadside unit 111 is stored in the memory 113. The communication module 114 conducts wired or wireless communication with an external device. For example, the external device is a terminal device such as a navigation device used in a vehicle approaching the roadside unit 111 or is a server device configured to determine the current position of a moving vehicle and to transmit traffic information to the vehicle. The external device may be a terminal device for manually calibrating the detector 112. The controller 115 controls the communication module 114 in such a manner that information about the type of the measurement subject and the position of the measurement subject in the real space as well as the location of the roadside unit 111 is transmitted to the external device, which in turn notifies the user of the position of the measurement subject.

The detector 112 will be described below in detail. The detector 112 includes sensors 116, a holder 117, and the information processing device 110.

The sensors 116 include a first sensor 118. The sensors 116 include at least one sensor in addition to the first sensor 118. In the second embodiment, the sensors 116 include the first sensor 118 and a second sensor 119.

The sensors 116 each detect motion of waves incident from many direction. For example, the sensors 116 each detect motion of electromagnetic waves and motion of sound waves. Examples of the electromagnetic waves include infrared radiation, visible radiation, ultraviolet radiation, and radio waves.

The sensors 116 each have a sensing axis. The sensors 116 are each capable of locating the points where the motion of detected waves is observed. The position of each point is detected as coordinates in a two-dimensional coordinate system defined relative to at least the sensing axis. The coordinates in the two-dimensional coordinate system that represent the points where the motion of detected waves is observed are included in the detection results given by the sensors 116. The two-dimensional coordinate system is defined by two coordinate axes parallel to a plane through which the sensing axis in a three-dimensional space passes. Alternatively, the two-dimensional coordinate system may be defined by two coordinate axes that do not coincide with the sensing axis in a three-dimensional space.

The sensors 116 may include sensors of the same kind or of different kinds. The sensors of the same kind may have different angles of view, in which case the sensors have different detection ranges. Alternatively, the sensors of the same kind may have the same detection range. The sensors 116 includes at least one of a visible light camera, an infrared camera, a radar, a LIDAR instrument, a TOF camera, sonar, an active range sensor, or a passive range sensor.

The first sensor 118 in the second embodiment is a visible light camera. The second sensor 119 in the second embodiment is a millimeter-wave radar. The first sensor 118 configured as a visible light camera detects electromagnetic waves or, more specifically, visible light propagating from object points and performs imaging on the basis of the detected visible light such that a captured image is produced. The second sensor 119 configured as a millimeter-wave radar detects millimeter waves reflected by various objects and determines the distance between each object and the second sensor 119 and the direction of each object.

The holder 117 holds the sensors 116. The sensors 116 are held by the holder 117 in a manner so as to be kept in their respective predetermined positions and in their respective predetermined orientations. The sensors 116 may be held by the holder 117 in a manner so as to be oriented in the same direction; that is, the sensors 116 may be held by the holder 117 in such a manner that their sensing axes are in parallel. Alternatively, the sensors 116 may be held by the holder 117 in such a manner that not all the sensors 116 are oriented in the same direction. It is preferred that the sensors 116 be tightly held in place by the holder 117 in a manner so as to be kept in the predetermined positions and predetermined orientations with respect to each other. The holder 117 may a strut or a flat plate on which each of the sensors 116 is fastened at three or more points. The holder 117 is preferably made of a material that is less prone to deform with temperature.

For example, the holder 117 having the sensors 116 held thereon is fastened to a structure that is tall enough to capture images of outdoor scenes including road surfaces. Examples of such a structure include traffic lights, utility poles, and streetlights. The position and orientation of each of the sensors 116 on the holder 117 fastened in place may be determined in advance. The position of each of the sensors 116 is defined with respect to its reference position in a world coordinate system, and the orientation of each of the sensors 116 is the inclination angle between each sensor 116 and its reference direction in the world coordinate system. The term "world coordinate system" herein refers to a coordinate system used to describe a three-dimensional space outside the sensors 116.

Figure 6:
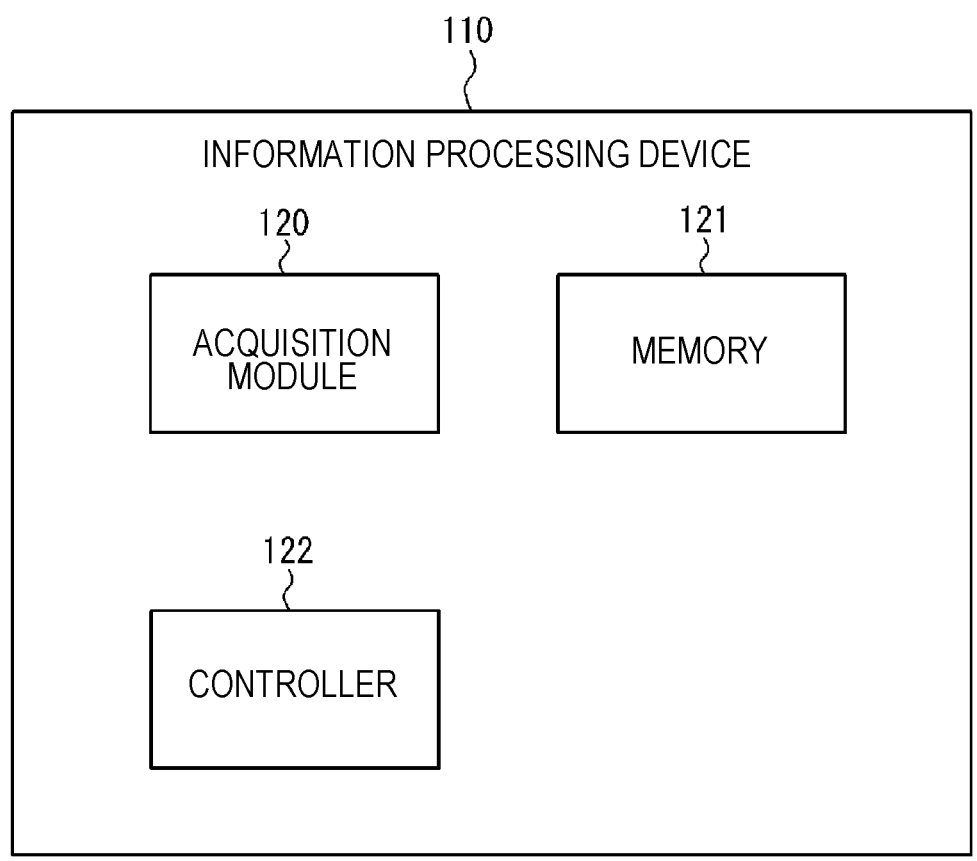
FIG. 6 is a block diagram illustrating the schematic configuration of the information processing device in FIG. 5.

Referring to FIG. 6, the information processing device 110 includes an acquisition module 120, a memory 121, and a controller 122.

The acquisition module 120 is an interface through which information and commands are transmitted to and received from the external device. For example, the acquisition module 120 acquires detection results from the sensors 116 and communicates with the controller 115 included in the roadside unit 111.

The memory 121 includes storage devices, such as random-access memory (RAM) and read-only memory (ROM). Various kinds of programs for causing the controller 122 to perform its functions and various kinds of information for use by the controller 122 are stored in the memory 121.

The positions and orientations in which the sensors 116 other than the first sensor 118 are placed with respect to the first sensor 118 are herein referred to as relative positions and relative orientation and are stored in the memory 121. In the specification of the present application, the sensors other than the first sensor 118 are also referred to as other sensors. The relative positions and the relative orientations are calculated using a terminal device for manual calibration, which will be described later, and are then stored in the memory 121.

The positions of specific feature points in the world coordinate system may be stored in the memory 121 for later recall in automatic calibration, which will be described later. Each of the specific feature points is a point whose location in the real space remains unchanged within the detection range of the first sensor 118 fastened to any specific structure with the holder 117 therebetween and can be identified by the controller 122, as will be described later. The positions of the specific feature points in the world coordinate system are stored in the memory 121 by using a terminal device for manual calibration, which will be described later.

The sensors 116 each detect the coordinates in the two-dimensional coordinate system. Conversion equations or conversion tables for conversion of the coordinates from the two-dimensional coordinate system to the world coordinate system may be stored in the memory 121. The world coordinate system may be defined by an axis representing the vertical direction in the real space and by two axes representing the respective directions parallel to a horizontal plane and orthogonal to each other. The coordinates in the detection results given by the sensors 116 are converted from the two-dimensional coordinate system to the world coordinate system by using the conversion equations or the conversion tables.

The conversion equation or the conversion table for the first sensor 118 may be calibrated by using a first calibration parameter for calibrating the position and the orientation of the first sensor 118. The conversion equations or the conversion tables for the other sensors may be calibrated by using a second calibration parameter for calibrating the positions and the orientations of the other sensors.

The controller 122 includes more than one processor and memory. Examples of the processors include a general-purpose processor and a purpose-built processor. The general-purpose processor fetches specific programs to perform specific functions. The purpose-built processor is tailored to a specific processing. The purpose-built processor may include an application-specific integrated circuit (ASIC). Examples of the processors also include a programmable logic device (PLD). The PLD may include a field-programmable gate array (FPGA). The controller 122 includes one processor or several processors that are integrated into a system-on-a-chip (SoC) configuration or a system in a package (SiP) to work in cooperation.

The sensors 116 held by the holder 117 detect motion of waves propagating from objects that are placed to determine correlation by calculation (i.e., objects for calculation of correlation). The controller 122 calculates the relative positions and the relative orientations of the other sensors 116 with respect to the first sensor 118 on the basis of the detected motion of waves propagating from the objects for calculation of correlation and incident on the sensors 116. This will be described below in detail.

Figure 7:
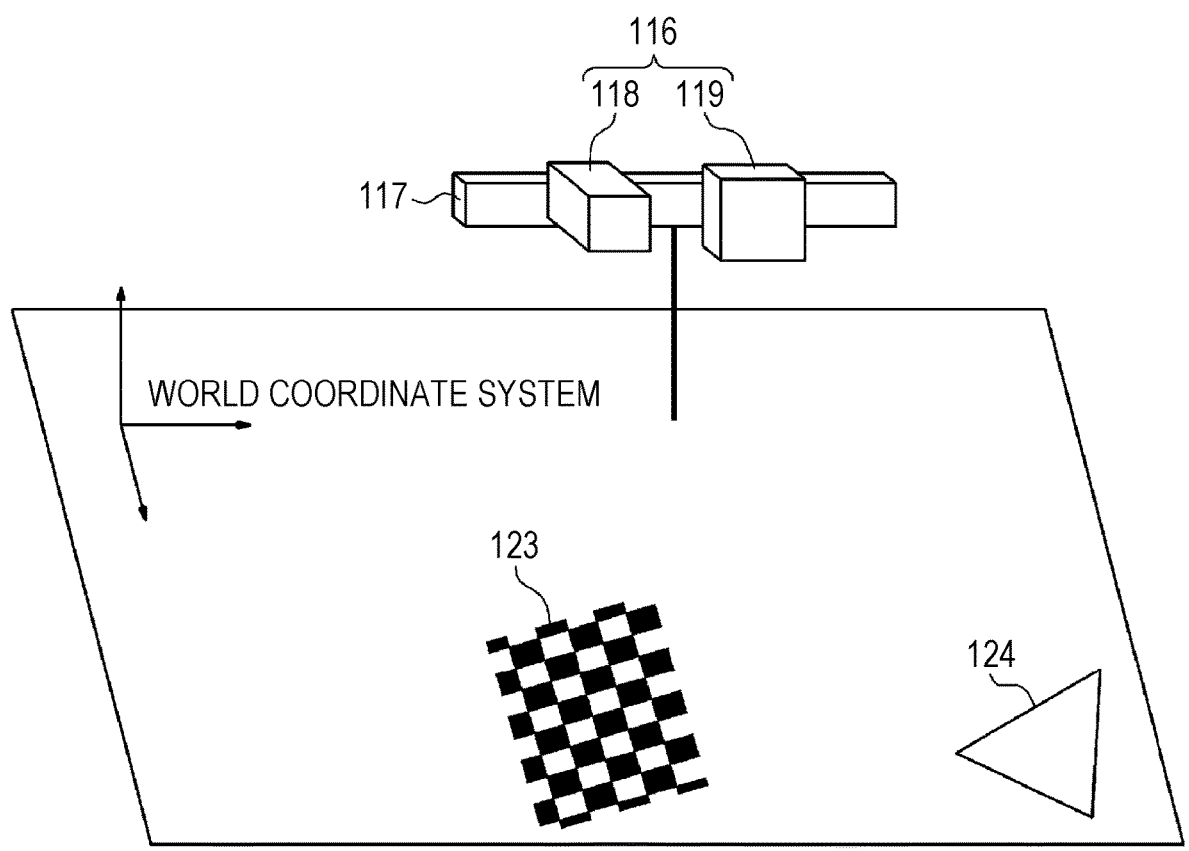
FIG. 7 illustrates the placement of objects for calculation of correlation, with which relative positions and relative orientations are calculated for a detector illustrated in FIG. 5.

The objects for calculation of correlation are deployed by, for example, the user. Referring to FIG. 7, the objects for calculation of correlation, which are for use in calculation of the relative positions and the relative orientations of the other sensors and are denoted by 123 and 124, are placed in the detection range of the sensors 116 held by the holder 117. In the second embodiment, the object 123 for calculation of correlation regarding the first sensor 118 and the object 124 for calculation of correlation regarding the second sensor 119 are put in place.

The user is to determine, by measurement, the positions of the objects 123 and 124 for calculation of correlation in the world coordinate system. The measurement for determining the positions is to be conducted in at least five locations. The at least five locations may include not only the locations of the objects 123 and 124 for calculation of correlation but also the locations corresponding to the coordinates in the two-dimensional coordinate system that are detected by the sensors 116 using the objects 123 and 124 for calculation of correlation. The user is to perform input on the terminal device for manual calibration to specify the positions in the world coordinate system that are determined by measurement.

The controller 122 calculates the relative positions and the relative orientations upon receipt of a request to do so from the terminal device for manual calibration by way of the acquisition module 120 and the communication module 114.

The controller 122 controls the acquisition module 120 in such a manner that the detection results given by the sensors 116 are transmitted to the terminal device for manual calibration. The acquisition module 120 in the second embodiment transmits, to the terminal device for manual calibration, detection results including information about the captured image produced by the first sensor 118 and information about the point where millimeter waves detected by the second sensor 119 are reflected, For each of the sensors 116, the user of the terminal device for manual calibration is to define the correspondence between the detection result obtained by using the objects 123 and 124 for calculation of correlation and their positions in the world coordinate system. In the second embodiment, the user is to define, for the object 123 for calculation of correlation, the correspondence between the position of the object 123 in the two-dimensional coordinate system (position coordinates of the image point of the object 123 in the captured image produced by the first sensor 118) and the position of the object 123 in the world coordinate system. In the second embodiment, the user is also to define, for the object 124 for calculation of correlation, the correspondence between the point where millimeter waves detected by the second sensor 119 are reflected (the angular coordinate of the point in the two-dimensional coordinate system) and the position of the object 124 in the world coordinate system (the position of the object 124 at the point of reflection). The user of the terminal device for manual calibration is to transmit, to the information processing device 100, pairs denoting the correspondence between the detection results obtained by using the objects 123 and 124 for calculation of correlation and their positions in the world coordinate system.

In exchange for transmitting the detection results, the controller 122 acquires, from the terminal device for manual calculation by way of the acquisition module 120, the pairs denoting the correspondence between the positions of the objects 123 and 124 (for calculation of correlation) in the two-dimensional coordinate system and their positions in the world coordinate system. After acquiring the pairs denoting the correspondence, the controller 122 stores the pairs in the memory 121.

In the execution of calculation of correlation, the controller 122 calculates the positions and the orientations of the sensors 116 in the world coordinate system by applying, for example, a five-point algorithm to the acquired pairs denoting the correspondence. The controller 122 calculates the relative positions by subtraction of the position of the first sensor 118 from the position of each of the other sensors. The controller 122 calculates the relative orientations by subtraction of the orientation of the first sensor 118 from the orientation of each of the other sensors. The relative positions and the relative orientations determined by calculation are then stored in the memory 121 by the controller 122. Alternatively, the relative positions and the relative orientations of the other sensors may be calculated by a known method such as the singular value decomposition of the essensial matrix between the sensors, in which case a vector denoting the relative position and a matrix denoting the relative orientation are determined by calculation.

The controller 122 conducts manual calibration in the following manner upon receipt of a request to do so from the terminal device for manual calibration by way of the acquisition module 120 and the communication module 114. For manual calibration, the user is to install the holder 117 in any specific location, with the sensors 116 held by the holder 117.

In the execution of manual calibration, the controller 122 acquires the positions of feature points in the world coordinate system. The feature points are points specified on the surface of an object for calibration. Feature points necessary for the execution of calibration are to be identified. For example, five or more feature points are preferably identified, ten or more feature points are more preferably identified, and twenty or more feature points are particularly preferably identified.

The object for calibration is used to calibrate the position and the orientation of the first sensor 118 during manual calibration. The object for calibration may be what is called a target and may be designed for installation outdoors and surface-treated to create motion of waves that can be detected by the first sensor 118. The first sensor 118 in the second embodiment is a visible light camera, in which case the object for calibration may be a target having a checkered pattern on its surface. Alternatively, the object for calibration is an object whose location in the real space remains unchanged within the detection range of the first sensor 118 held by the holder 117 installed on a structure and has points capable of being detected by the controller 122. In the second embodiment, the first sensor 118 is a visible light camera, and the object for calibration may be an object whose location in the real space remains unchanged. For example, the object for calibration may be a road marking on a road surface or a structure on a floor surface.

The controller 122 acquires the positions of the feature points in the world coordinate system from, for example, GPS receivers or the terminal device for manual calibration by way of the acquisition module 120. After acquiring information about the positions of the feature points in the world coordinate system, the controller 122 stores the information in the memory 121. In the case where the object for calibration is an object whose location in the real space remains unchanged within the detection range of the first sensor 118 and has points capable of being detected by the controller 122, the information about the positions of the specific feature points in the world coordinate system is acquired and is then stored in the memory 121 by the controller 122 for later recall in automatic calibration, which will be described later.

The positional information may be acquired from the GPS receivers in the following manner. For acquisition of the positional information, the user is to install GPS receivers on the specific feature points. In the case where each of the object for calibration in the second embodiment is what is called a target, the user is to install a GPS receiver on the feature points of the object for calibration. In the case where the object for calibration in the second embodiment is a road marking or a structure, the user is to install a GPS receiver in a place where the GPS receiver lends itself to being identified by the controller 122 on the basis of the detection results. For example, the GPS receiver is to be placed on a corner of a road marking on a road surface within the detection range of the first sensor 118 or is to be placed on a corner of the lower end of a vending machine on a floor surface within the detection range of the first sensor 118.

Each GPS receiver calculates its position in a horizontal plane on the basis of signals received from several satellites. When receiving the information about the location of the GPS receiver directly from the GPS receiver or by way of the terminal device for manual calibration, the controller 122 uses the received information in combination with the coordinate in the height direction for specifying the vertical position of the feature points of the object for calibration. In this way, the controller 122 acquires the positions of the feature points in the world coordinate system. In the case where the object for calibration in the second embodiment is what is called a target, the vertical position of the feature points of the object for calibration is the vertical position of the feature points on the target. In the case where the object for calibration in the second embodiment is a road marking or a structure, the vertical position of the feature points of the object for calibration is the vertical position of a road surface or a floor surface.

Alternatively, the positional information may be acquired from the terminal device for manual calibration in the following manner. The terminal device for manual calibration displays a map or a survey drawing on its display, where an aerial photograph of a region around the structure to which the holder 117 is fastened is superimposed on the map or the survey drawing. The user of the terminal device is to perform input for specifying, on the map or the survey drawing, the positions of the feature points of the object for calibration. After specifying the positions, the user is to transmit the information about the positions to the information processing device 100. When receiving the information about the specified positions in the aerial photograph from the terminal device for manual calibration, the controller 122 uses the received information in combination with the coordinate in the height direction for specifying the vertical position of the feature points of the object for calibration. In this way, the controller 122 acquires the positions of the feature points in the world coordinate system. The vertical position of the feature points of the object for calibration is as has been defined above in relation to the acquisition of the positional information from the GPS receiver.

After or in parallel with the acquisition of the positions of the feature points in the world coordinate system, the controller 122 controls the acquisition module 120 in such a manner that the detection result given by the first sensor 118 is transmitted to the terminal device for manual calibration, where the correspondence between each feature point and the detection result given by the first sensor 118 is to be defined. In the second embodiment, the first sensor 118 is a camera, and the controller 122 transmits, to the terminal device for manual calibration, the captured image produced by the first sensor 118.

The user of the terminal device for manual calibration is to perform input for defining the correspondence between each feature point and the coordinates of the feature point in the two-dimensional coordinate system in the detection results of the first sensor 118. In the second embodiment, the first sensor 118 is a visible light camera, and the user is to perform input for defining the correspondence between each feature point and the position of the feature point in the captured image produced by the first sensor 118. The terminal device for manual calibration displays the captured image and a map on which the positions of the feature points in a horizontal plane are shown on the basis of the positions of the feature points in the world coordinate system. The user is to perform input for specifying the positions of the feature points in the captured image while looking at the positions of the feature points shown on the map. The user is to transmit, to the information processing device 100, the correspondence between each feature point and the coordinates in the two-dimensional coordinate system in the detection result the first sensor 118.

In exchange for transmitting the captured image, the controller 122 acquires, from the terminal device for manual calculation by way of the acquisition module 120, the pairs denoting the correspondence between the feature points and the coordinates in the two-dimensional coordinate system in the detection result given by the first sensor 118. After acquiring the pairs denoting the correspondence, the controller 122 stores the pairs in the memory 121.

The controller 122 applies, for example, a five-point algorithm to the pairs denoting the correspondence to calculate the first calibration parameter for calibrating the conversion equation or the conversion table. The controller 122 calibrates the conversion equation or the conversion table for the first sensor 118 by using the calculated first calibration parameter and then stores the calibrated conversion equation or the calibrated conversion table in the memory 121 again.

The calculated first calibration parameter and the information about the relative positions and the relative orientations that is stored in the memory 121 are used by the controller 122 to calculate the second calibration parameter for calibrating the positions and the orientations of the sensors 116 other than the first sensor 118. The controller 122 calibrates the conversion equations or the conversion tables for the sensors 116 other than the first sensor 118 by using the calculated second calibration parameter and then stores the calibrated conversion equations or the calibrated conversion tables in the memory 121 again.

The positions of the specific feature points in the world coordinate system are stored in the memory 121, in which case the controller 122 uses the calibrated conversion equation or the calibrated conversion table for the first sensor 118 to convert the positions of the specific feature points in the world coordinate system to coordinates in the two-dimensional coordinate system in the detection result given by the first sensor 118. The coordinates in the two-dimensional coordinate system are then stored in the memory 121 by the controller 122. The controller 122 extracts feature values of the specific feature points from the detection result given by the first sensor 118 and from the coordinates in the two-dimensional coordinate system. The controller 122 then stores the extracted feature values in the memory 121.

After ending manual calibration, the controller 122 may estimate the shape of the road surface or the floor surface on the basis of the detection results given by the sensors 116. More specifically, the controller 122 estimates the position of the road surface or the floor surface in the world coordinate system on the basis of the detection results given by at least one of the sensors 116. The controller 122 then makes corrections to the estimated position of the road surface and the floor surface in the world coordinate system on the basis of the detection results given by the sensors other than the at least one sensor. The shape of the road surface or the floor surface is then estimated on the basis of the corrections made to the estimated position.

In the second embodiment, the first sensor 118 is a visible light camera, and the controller 122 determines the bounds of the road surface or the floor surface in the captured image produced by the first sensor 118. For example, the bounds of the road surface or the floor surface may be determined by a well-known method, such as machine learning, pattern matching, or free space detection. The controller 122 calculates the vertical positions of freely selected points on the road surface or the floor surface on the basis of the distance between the second sensor 119 and each of the freely selected points within the bounds of the road surface or the floor surface. The distance is determined by the second sensor 119, which is a millimeter-wave radar. The controller 122 then makes corrections to the vertical positions of the freely selected points on the road surface or the floor surface in the world coordinate system on the basis of the calculated vertical positions.

The information about the corrected position of the road surface or the floor surface in the world coordinate system may be stored the memory 121 by the controller 122. The controller 122 may correct the conversion equation or the conversion table in the memory 121 on the basis of the corrected position of the road surface or the floor surface in the world coordinate system.

The controller 122 can conduct automatic calibration after ending manual calibration. Automatic calibration may be conducted every time the first sensor 118 detects motion of waves. Automatic calibration may be conducted in a predetermined period or at regular intervals. In the second embodiment, automatic calibration is conducted in a predetermined period.

In automatic calibration, the controller 122 detects, in the detection result newly given by the first sensor 118, coordinates in the two-dimensional coordinate system that correspond to the specific feature points. The coordinates are detected on the basis of the feature values stored in the memory 121. The controller 122 determines whether the discrepancy between the detected coordinates and the coordinates of the specific feature points stored in the memory 121 is greater than or equal to a threshold value.

If the positional discrepancy greater than or equal to the threshold value is found with regard to the percentage or more of the feature points, the controller 122 recalculates the first calibration parameter by using the coordinates of the specific feature points in the two-dimensional coordinate system and the positions of the specific feature points in the world coordinate system in the memory 121. The coordinates in the two-dimensional coordinates system represent the point where the motion of waves detected by the first sensor 118 is observed.

The controller 122 fetches the conversion equation or the conversion table for the first sensor 118 from the memory 121 and then calibrates the conversion equation or the conversion table by using the recalculated first calibration parameter. The controller 122 then stores the calibrated conversion equation or the calibrated conversion table in the memory 121. The controller 122 uses the calibrated conversion equation or the calibrated conversion table to convert the positions of the specific feature points in the world coordinate system in the memory 121 to coordinates in the two-dimensional coordinate system in the detection result given by the first sensor 118. After undergoing the conversion, the coordinates in the two-dimensional coordinate system are stored in the memory 121 by the controller 122 for later use in determining the feasibility of automatic calibration. The controller 122 then conducts automatic calibration, using the new coordinates in the two-dimensional coordinate system.

After conducting manual calibration or automatic calibration, the controller 122 determines whether there is a measurement subject in the region around the roadside unit 111, and/or the controller 20 calculates the position of the measurement subject.

When acquiring a frame of captured image from the first sensor 118, the controller 122 in the second embodiment determines whether there is a measurement subject seen in the captured image. The controller 122 determines whether there is a measurement subject, on the basis of the detectability of the measurement subject in the captured image. For example, the controller 122 employs a well-known detection method, such as pattern matching or deep learning. When detecting a measurement subject on a road surface or a floor surface, the controller 122 determines the position of the measurement subject on the road surface or the position of the lower end of the measurement subject on the floor surface. The controller 122 fetches the conversion equation or the conversion table for the first sensor 118 from the memory 121 and then converts the determined position to the position in the world coordinate system by using the conversion equation or the conversion table. The controller 122 controls the acquisition module 120 in such a manner that information about the measurement subject and its position in the world coordinate system is transmitted to the external device.

When the distance between the second sensor 119 and an object with an angle of inclination from the sensing axis of the second sensor 119 is determined by the second sensor 119, the controller 122 in the second embodiment extracts, from the detection result given by the second sensor 119, the distance between the second sensor 119 and the measurement subject detected in the captured image produced by the first sensor 118. The controller 122 calculates the position of the measurement subject in the world coordinate system on the basis of the distance between the second sensor 119 and the measurement subject. The controller 122 controls the acquisition module 120 in such a manner that information about the measurement subject and its position in the world coordinate system is transmitted to the external device.

Figure 8:
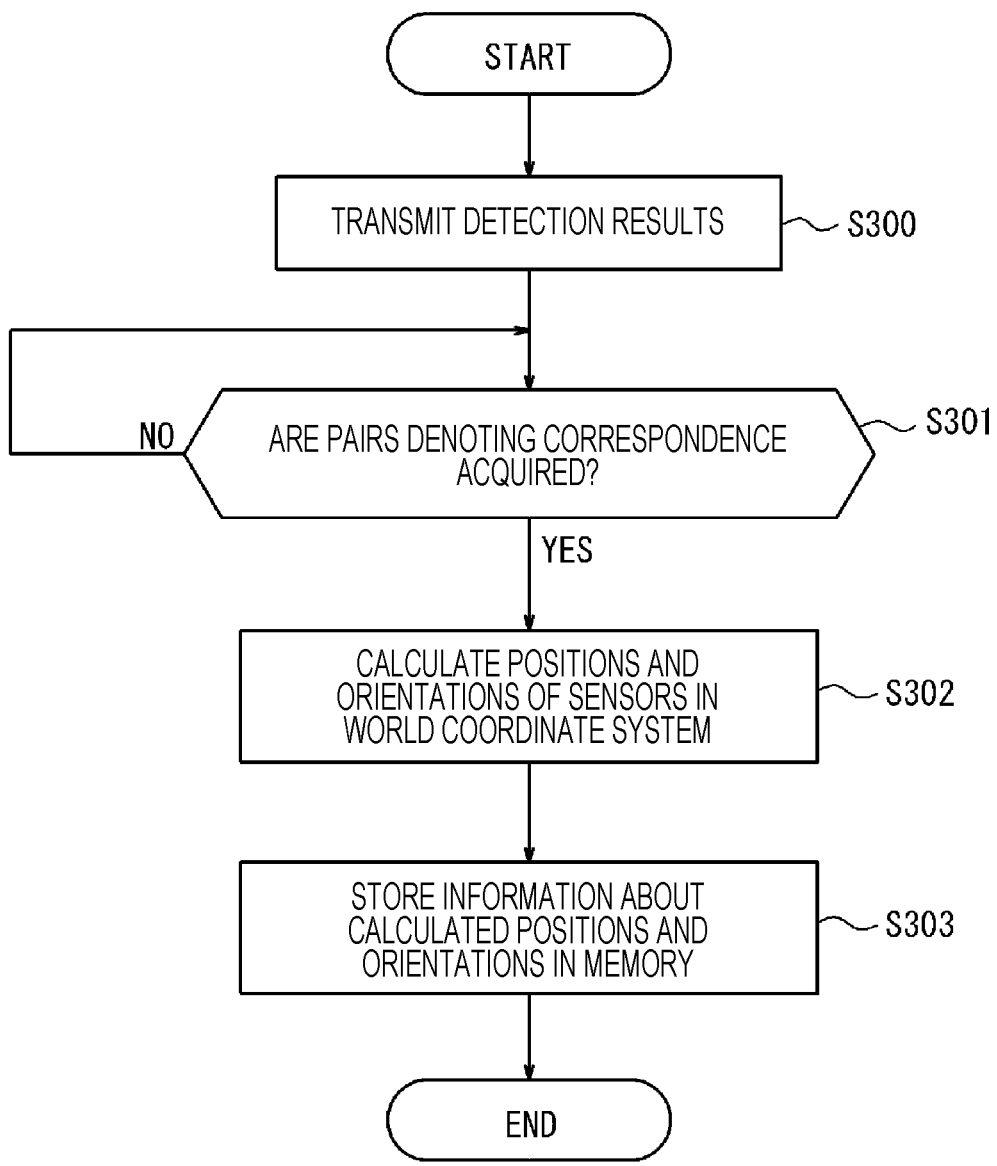
FIG. 8 is a flowchart for describing how a controller in FIG. 6 executes a correlation calculation procedure.

A procedure by which the controller 122 in the second embodiment calculates correlation will be described below with reference to the flowchart in FIG. 8. The correlation calculation procedure starts when a request to calculate the relative position and the relative orientation is received from the terminal device for manual calibration. As mentioned above, the objects 123 and 124 for calculation of correlation are placed in the detection range of the sensors 116 held by the holder 117 before execution of the correlation calculation procedure.

In Step S300, the controller 122 controls the acquisition module 120 in such a manner that the detection results given by the sensors 116 are transmitted to the terminal device for manual calibration. Progression to Step S301 occurs subsequent to the transmission.

In Step S301, the controller 122 determines, for each of the objects 123 and 124 for calculation of correlation, whether pairs denoting the correspondence between the detection result and the position in the world coordinate system are acquired from the terminal device for manual calculation after the transmission of detection results to the terminal device in Step S300. If the acquisition of the pairs is not determined, a return to Step S301 is made. If the acquisition of the pairs is determined, progression to Step S302 occurs.

In Step S302, the controller 122 calculates the positions and the orientations of the sensors 116 in the world coordinate system by using the pairs denoting the correspondence after the acquisition of the pairs is determined in Step S301. The controller 122 calculates the relative position of each sensor 116 on the basis of the calculated positions of the other sensors 116. The controller 122 calculates the relative orientation of each sensor 116 on the basis of the calculated orientations of the other sensors 116. Progression to Step S303 occurs subsequent to the calculation.

In Step S303, information about the relative positions and the relative orientations determined by calculation in Step S302 is then stored in the memory 121 by the controller 122. With the information stored, the manual calibration procedure ends.

Figure 9:
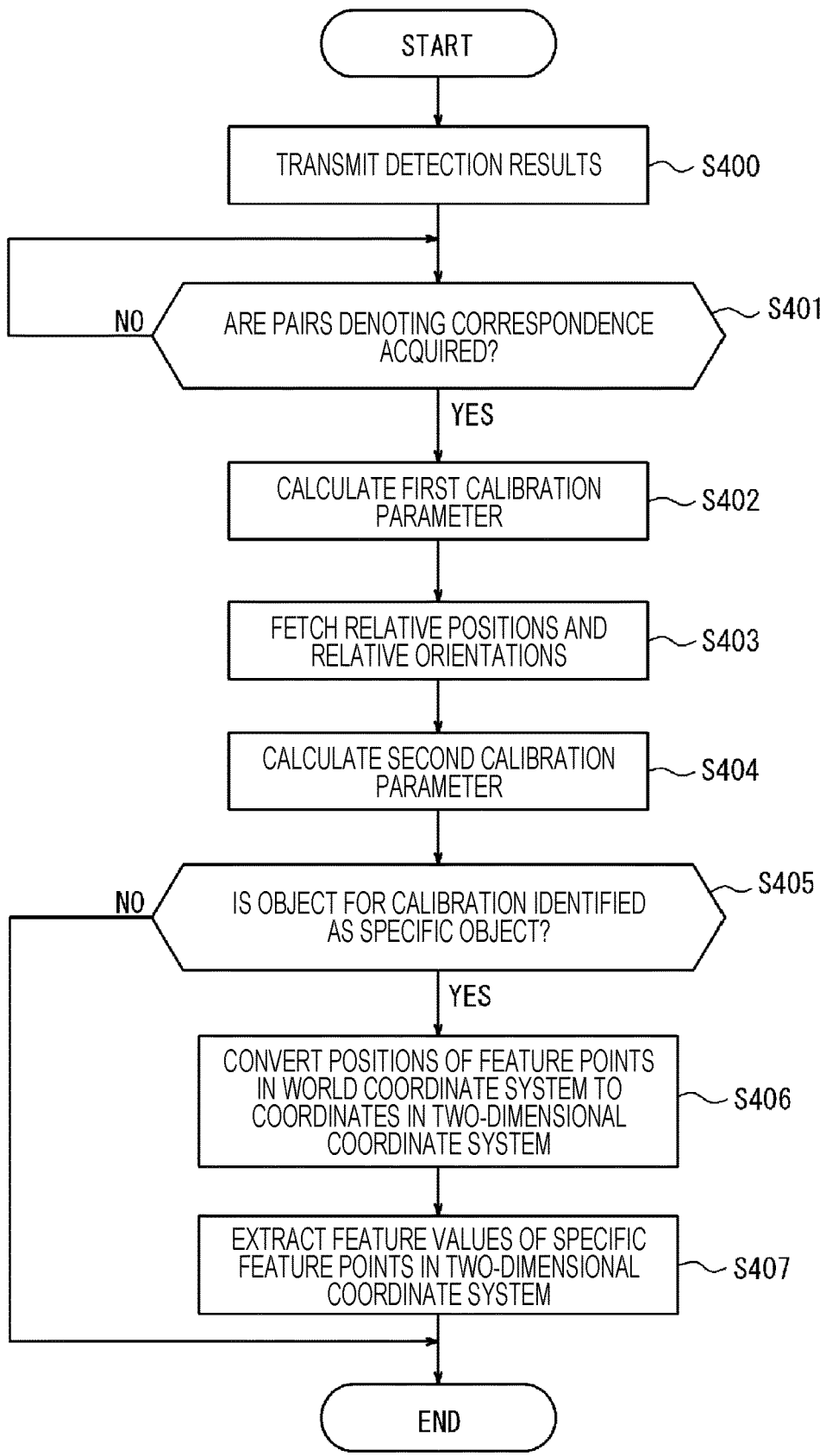
FIG. 9 is a flowchart for describing how the controller in FIG. 6 executes a manual calibration procedure.

A procedure by which the controller 122 in the second embodiment conducts manual calibration will be described below with reference to the flowchart in FIG. 9. The controller 122 starts executing the manual calibration procedure upon receipt of a request to do so from the terminal device for manual calibration. As mentioned above, the holder 117 is installed in any specific location before the execution of the manual calibration procedure, with the sensors 116 held by the holder 117.

In Step S400, the controller 122 controls the acquisition module 120 in such a manner that the detection result given by the first sensor 118 is transmitted to the terminal device for manual calibration. Progression to Step S401 occurs subsequent to the transmission.

In Step S401, the controller 122 determines, for each of the feature points, whether pairs denoting the correspondence between the detection result and the position in the world coordinate system are acquired from the terminal device for manual calculation after the transmission of detection result to the terminal device in Step S400. If the acquisition of the pairs is not determined, a return to Step S401 is made. If the acquisition of the pairs is determined, progression to Step S402 occurs.

In Step S402, the controller 122 calculates the first calibration parameter by using the pairs denoting the correspondence after the acquisition of the pairs is determined in Step S401. The controller 122 fetches the conversion equation or the conversion table for the first sensor 118 from the memory 121 and calibrates it by using the calculated first calibration parameter. The controller 122 then stores the calibrated conversion equation or the calibrated conversion table in the memory 121 again. Progression to Step S403 occurs subsequent to the calculation.

In Step S403, the controller 122 fetches the relative positions and the relative orientations of the other sensors from the memory 121. Progression to Step S404 occurs subsequent to the fetch.

In Step S404, the controller 122 calculates the second calibration parameter on the basis of the first calibration parameter calculated in Step S402 and the relative positions and the relative orientations fetched in Step S403. The controller 122 fetches the conversion equations or the conversion tables for the other sensors from the memory 121 and calibrates them by using the calculated second calibration parameter. The controller 122 then stores the calibrated conversion equations or the calibrated conversion tables in the memory 121 again. Progression to Step S405 occurs subsequent to the calculation.

In Step S405, the controller 122 determines whether the object for calibration relevant to the detection result given by the first sensor 118 and transmitted in Step S400 is a specific object whose position in the world coordinate system remains unchanged within the detection range of the first sensor 118 and has points capable of being detected by the controller 122. If the object for calibration is identified as the specific object, progression to Step S406 occurs. If the object for calibration is not identified as the specific object, the manual calibration procedure ends.

In Step S406, the controller 122 performs conversion of coordinates of the feature points in the pairs denoting the correspondence and acquired in Step S401, where the positions of the feature points in the world coordinate system are converted to coordinates in the two-dimensional coordinate in the detection result given by the first sensor 118. After undergoing the conversion, the coordinates in the two-dimensional coordinate system are stored in the memory 121 by the controller 122. Progression to Step 407 occurs subsequent to the conversion.

In Step S407, the controller 122 extracts feature values of the feature points from the detection result given by the first sensor 118 (the detection results transmitted in Step S400) and from the coordinates in the two-dimensional coordinate system (the coordinates converted in Step S406). The controller 122 then stores the extracted feature values in the memory 121. With the feature values stored, the manual calibration procedure ends.

A procedure by which the controller 122 in the second embodiment performs road surface estimation will be described below with reference to the flowchart in FIG. 10. The road surface estimation procedure starts, for example, after manual calibration or automatic calibration ends. An example will be described below in which the first sensor 118 and the second sensor 119 are a visible light camera and a millimeter-wave radar, respectively.

In Step S500, the controller 122 detects the bounds of the road surface or the floor surface in the captured image produced by the first sensor 118. Progression to Step S501 occurs after the detection.

In Step S501, the controller 122 determines, on the basis of the detection results given by the second sensor 119, the distance between the second sensor 119 and each of the freely selected points within the bounds of the road surface or floor surface detected in Step S500. Progression to Step S502 occurs after the distance is determined.

In Step S502, the controller 122 calculates the positions of the freely selected points in the world coordinate system (the positions of the points for which the distance is determined in Step S501) by using the positions of the points in the captured image and the first calibration parameter stored in the memory 121. The controller 122 then makes corrections to the calculated vertical positions of the points in the world coordinate system on the basis of the distance determined in Step S501. The controller 122 fetches the conversion equations or the conversion tables for the sensors 116 from the memory 121 and then makes corrections to the conversion equations or the conversion tables by using the corrected positions of the points in the world coordinate system. The road surface definitization processing ends after the corrections are made.

As described above, the information processing device 100 according to the second embodiment calculates the first calibration parameter for calibrating the position and the orientation of the first sensor 118 and the second calibration parameter for calibrating the positions and the orientations of the other sensors. The information processing device 100 calculates the first calibration parameter on the basis of the detection result given by the first sensor 118 capable of detecting motion of waves propagating from the object for calibration. The information processing device 100 calculates the second calibration parameter on the basis of the first calibration parameter and the information about the relative positions and the relative orientations that is stored in the memory 121. With the first sensor 118 and the other sensors 116 being held by the holder 117, the relative positions and the relative orientations of the other sensors 116 with respect to the position and orientation of the first sensor 118 may be calculated in advance during the process of manufacturing and may be stored in the information processing device 100. Thus, calibration of only the first sensor 118 will suffice; that is, along with the first sensor 118, the other sensors 116 held by the holder 117 installed outdoors can be calibrated by the information processing device 100. This feature of the information processing device 100 lightens the user's workload in calibrating each sensor 116 during installation and provides ease of calibrating the sensors 116 outdoors.

The information processing device 100 according to the second embodiment estimates the shape of the road surface or the floor surface on the basis of the detection results given by the sensors 116. Thus, the information processing device 100 can achieve an improvement in accuracy needed to estimate the positions of the measurement subject in the world coordinate system on the basis of imagery information, such as a captured image that is the detection result given by the sensor.

In a case where manual calibration involves the use of the object for calibration that is an object whose position in the world coordinate system remains unchanged within the detection range of the first sensor 118 and that has points capable of being detected by the controller 122, the information processing device 100 according to the second embodiment stores, in the memory 121, the coordinates of the specific feature points in the two-dimensional coordinate system in the detection result given by the first sensor 118. In a case where the discrepancy between the coordinates in the two-dimensional coordinates system newly detected by the first sensor 118 and the coordinates in the two-dimensional system stored in the memory 121 is greater than or equal to a threshold value, the information processing device 100 recalibrates the first calibration parameter. Points whose positions in the world coordinate system remain unchanged may be designated as specific feature points. With the specific feature points designated, the information processing device 100 can automatically calculate the first calibration parameter for calibration without the need to place a measurement object for calibration within the detection range of the first sensor 118.

Although the present invention has been described above with reference to the accompanying drawings and by means of examples, various alterations or modifications may be made on the basis of the present disclosure by those skilled in the art. It is to be understood that such alterations and modifications fall within the scope of the present invention.

Tasks that are involved in manual calibration and are to be performed by the image processing device 10 according to the first embodiment include calculation of the initial value of the calibration parameter, calculation of the reference positions, and extraction of feature values of the reference feature points. At least one of these tasks may be taken over by the terminal device for manual calibration. The image processing device 10 may acquire, from the terminal device for manual calibration, the initial value of the calibration parameter, the reference positions, and the feature values, in which case effects similar to those in the first embodiment will be produced.

The information processing device 100 according to the second embodiment is to calculate the positions and the orientations of the sensors 116 by using the pairs denoting the correspondence and is also to calculate the relative position and the relative orientation of each of the sensors 116 on the basis of the positions and the orientations of the other sensors 116. At least one of these tasks may be taken over by the terminal device for manual calibration. The information processing device 100 may acquire, from the terminal device for manual calibration, the position and the orientation of each of the sensors 116 calculated by using the pairs denoting the correspondence or the relative position and the relative orientation of each of the sensors 116 calculated on the basis of the positions and the orientations of the other sensors 116, in which case effects similar to those in the second embodiment will be produced.

In the second embodiment, two sensors or, more specifically, the first sensor 118 and the second sensor 119 are included as the sensors 116. Alternatively, three or more sensors may be included as the sensors 116. For example, a visible light camera, a millimeter-wave radar, and an infrared camera may be included as the sensors. It is not required that the first sensor 118 in the second embodiment be a visible light camera. In a case where the manual calibration procedure can be executed only under low light conditions after the holder 117 is fastened to a structure, it may be difficult to determine the position by using a visible light camera. Under these circumstances, an infrared camera may be used as the first sensor 118 to conduct manual calibration.

Unless otherwise specified, the network considered herein is selected from the group consisting of the Internet, an ad hoc network, a local area network (LAN), a wide area network (WAN), a metropolitan area network (MAN), a cellular network, a wireless wide area network (WWAN), a wireless personal area network (WPAN), a public switched telephone network (PSTN), a terrestrial wireless network, other networks, and combinations thereof. For example, such a wireless network consists of access points (e.g., Wi-Fi access points) and femtocells. The wireless communication device considered herein can connect to wireless networks based on wireless technology such as Wi-Fi, Bluetooth, cellular communication technology (e.g., Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA)), and/or other technical standards. Such a network may be based on one or more standards, examples of which include Universal Mobile Telecommunications System (UTMS), Long Term Evolution (LTE), Evolution-Data Optimized or Evolution-Data Only (EV-DO), Global System for Mobile Communications (GSM), Worldwide Interoperability for Microwave Access (WiMAX), Code Division Multiple Access-2000 (CDMA-2000), or Time Division Synchronous Code Division Multiple Access (TD-SCDMA).

The system disclosed herein includes a variety of modules and/or units for performing particular functions. While these modules and units have been schematically illustrated for brief description of their functionalities, these modules and units are not necessarily intended as particular hardware and/or software. In this respect, the modules, the units, and the other components may be hardware and/or software implemented to substantially perform the specific functions described herein. The various functions of the different components may be achieved by discrete hardware or software or various combinations thereof, and these functions each may be used alone or may be used in combination. A keyboard, a display, a touchscreen, a pointing device, other input/output means, I/O devices, or a user interface may be connected to the system, either directly or via an intervening I/O controller. As has been described above, various aspects of the present disclosure can be carried out in many different modes, which are all included in the scope of the disclosure.

REFERENCE SIGNS LIST

10 image processing device
11, 111 roadside unit
12 imaging module
13 imager
14 memory
15 communication module
16 controller
17 image interface
18 information interface
19 memory
20 controller
110 information processing device
112 detector
113 memory
114 communication module
115 controller
116 sensors
117 holder
118 first sensor
119 second sensor
120 acquisition module
121 memory
122 controller
123 object
124 object

The invention claimed is:

1. An image processing device, comprising:
an image interface that acquires a captured image from an imaging module;
a memory in which locations of feature points in a world coordinate system are stored, the feature points being located on a road surface or a floor surface in a first captured image provided by the imaging module, wherein first reference locations of the feature points in a first captured image provided by the imaging module at a specific timing are further stored in the memory; and a controller that detects second reference locations of the feature points in the second captured image and calculates based on the feature points and the locations in the world coordinate system, a calibration parameter for calibrating a location of the imaging module and an orientation of the imaging module, wherein the controller detects the second reference locations of the feature points in the second captured image provided by the imaging module at a timing different from the specific timing, and recalculates the calibration parameter in response to finding a discrepancy between the second reference locations and the first reference locations with regard to a predetermined percentage or more of the feature points.

2. The image processing device according to claim 1, further comprising an information interface that acquires the locations of the feature points in the first captured image provided by the imaging module and the locations of the specific feature points in the world coordinate system, wherein the controller obtains an initial value of the calibration parameter by calculation based on the locations acquired from the information interface and including the locations of the feature points in the first captured image and the locations of the feature points in the world coordinate system.

3. The image processing device according to claim 2, wherein the locations in the world coordinate system that are acquired by the information interface include locations calculated based on signals received by GPS receivers installed in locations corresponding to feature points.

4. The image processing device according to claim 2, wherein the locations in the world coordinate system that are acquired by the information interface include locations specified on a map or on a survey drawing.

5. The image processing device according to claim 1, wherein the locations of the feature points in the world coordinate system are converted to locations in the second captured image by using the calibration parameter and are stored in the memory as the second reference locations by the controller.

6. The image processing device according to claim 1, wherein in a case where not all the second reference locations of the feature points are detectable in the second captured image, the controller calculates the calibration parameter by using the second reference locations of the feature points except for those undetectable in the second captured image.

7. The image processing device according to claim 6, wherein in a case where the number of the second reference locations of the feature points detectable in the second captured image is out of a practical reference range, the controller stops calculating the calibration parameter.

8. An imager comprising:
an imaging module that captures an image to provide a captured image; and
the image processing device according to claim 1.

9. A roadside unit, comprising:
an imaging module that captures an image to provide a captured image; and
the image processing device according to claim 1.

10. An image processing method comprising:
storing locations of feature points in a world coordinate system, the feature points being located on a road surface or a floor surface in a first captured image provided by an imaging module;
storing first reference locations of the feature points in a first captured image provided by the imaging module at a specific timing;
detecting second reference locations of the feature points in a second captured image provided by the imaging module at a timing different from the specific timing; and
calculating, based on the feature points and the locations in the world coordinate system, a calibration parameter for calibrating a location of the imaging module and an orientation of the imaging module in response to finding a discrepancy between the second reference locations and the first reference locations with regard to a predetermined percentage or more of the feature points.

* * * * *